US010298695B2

(12) United States Patent
Palin et al.

(10) Patent No.: US 10,298,695 B2
(45) Date of Patent: May 21, 2019

(54) COGNITIVE CONNECTIVITY MANAGEMENT

(75) Inventors: Arto Palin, Viiala (FI); Jukka Reunamäki, Tampere (FI)

(73) Assignee: Provenance Asset Group LLC, Pittsford, NY (US)

( * ) Notice: Subject to any disclaimer, the term of this patent is extended or adjusted under 35 U.S.C. 154(b) by 2375 days.

(21) Appl. No.: 12/947,468

(22) Filed: Nov. 16, 2010

(65) Prior Publication Data

US 2012/0124225 A1    May 17, 2012

(51) Int. Cl.
| | |
|---|---|
| *H04W 4/02* | (2018.01) |
| *H04W 8/00* | (2009.01) |
| *H04L 29/08* | (2006.01) |
| *H04W 24/02* | (2009.01) |
| *H04W 28/04* | (2009.01) |
| *H04W 48/16* | (2009.01) |

(52) U.S. Cl.
CPC ............. *H04L 67/16* (2013.01); *H04W 8/005* (2013.01); *H04W 4/023* (2013.01); *H04W 24/02* (2013.01); *H04W 28/04* (2013.01); *H04W 48/16* (2013.01)

(58) Field of Classification Search
CPC .... H04B 1/385; H04B 1/3833; H04B 1/3888; G06F 17/3089; G06F 21/6218; H04L 12/5601; H04L 12/5695; H04L 29/06; H04L 29/0809; H04L 29/06537; H04L 29/08072; H04L 29/08117; H04L 29/08144; H04L 29/08576; H04L 29/08657; H04L 29/08981; H04L 49/3081; H04L 63/08; H04L 2012/563; H04L 45/14; H04L 47/70; H04L 63/101; H04L 63/0272; H04L 67/16; H04L 67/327; G06Q 10/10; G06Q 30/02; H04Q 11/04; H04Q 11/0428; H04Q 11/0478; H04Q 2213/13; H04W 36/08; H04W 36/30; H04W 36/32; H04W 64/00; H04W 76/007; H04W 4/023; H04W 8/005; H04W 24/02; H04W 28/04; H04W 48/16; G01S 5/02; G01S 5/0252; G08B 25/016; H04M 11/04; H04M 11/062; H04M 1/05; H04M 1/6058
USPC ..... 709/228, 217, 218, 219, 225; 370/395.2, 370/420; 455/404.2, 440, 456.1, 575.6
See application file for complete search history.

(56) References Cited

U.S. PATENT DOCUMENTS

| | | |
|---|---|---|
| 6,941,146 B2 | 9/2005 | Knauerhase et al. |
| 7,286,838 B2 | 10/2007 | Knauerhase et al. |
| 2005/0250448 A1 | 11/2005 | Knauerhase et al. |
| 2005/0289095 A1* | 12/2005 | Rauhala et al. ................. 707/1 |
| 2007/0197260 A1* | 8/2007 | Randall et al. ............... 455/557 |
| 2008/0165740 A1* | 7/2008 | Bachmann et al. .......... 370/332 |
| 2011/0047539 A1 | 2/2011 | Reunamaki et al. |

(Continued)

*Primary Examiner* — Walter J Divito
*Assistant Examiner* — Dharmesh J Patel
(74) *Attorney, Agent, or Firm* — Dinsmore & Shohl LLP

(57) ABSTRACT

A system for configuring communications in an apparatus. An apparatus may determine whether access to resources not in the apparatus is desired. If it is determined that access to the resource is desired, an access request may be sent to a resource manager. The apparatus may then receive connection information in response to the access request, and may then utilize the connection information when selecting a communication configuration usable for accessing the desired resources that are accessible via the other apparatus.

21 Claims, 17 Drawing Sheets

(56) References Cited

U.S. PATENT DOCUMENTS

2011/0305206 A1 12/2011 Junell et al.
2012/0058790 A1 3/2012 Junell et al.

* cited by examiner

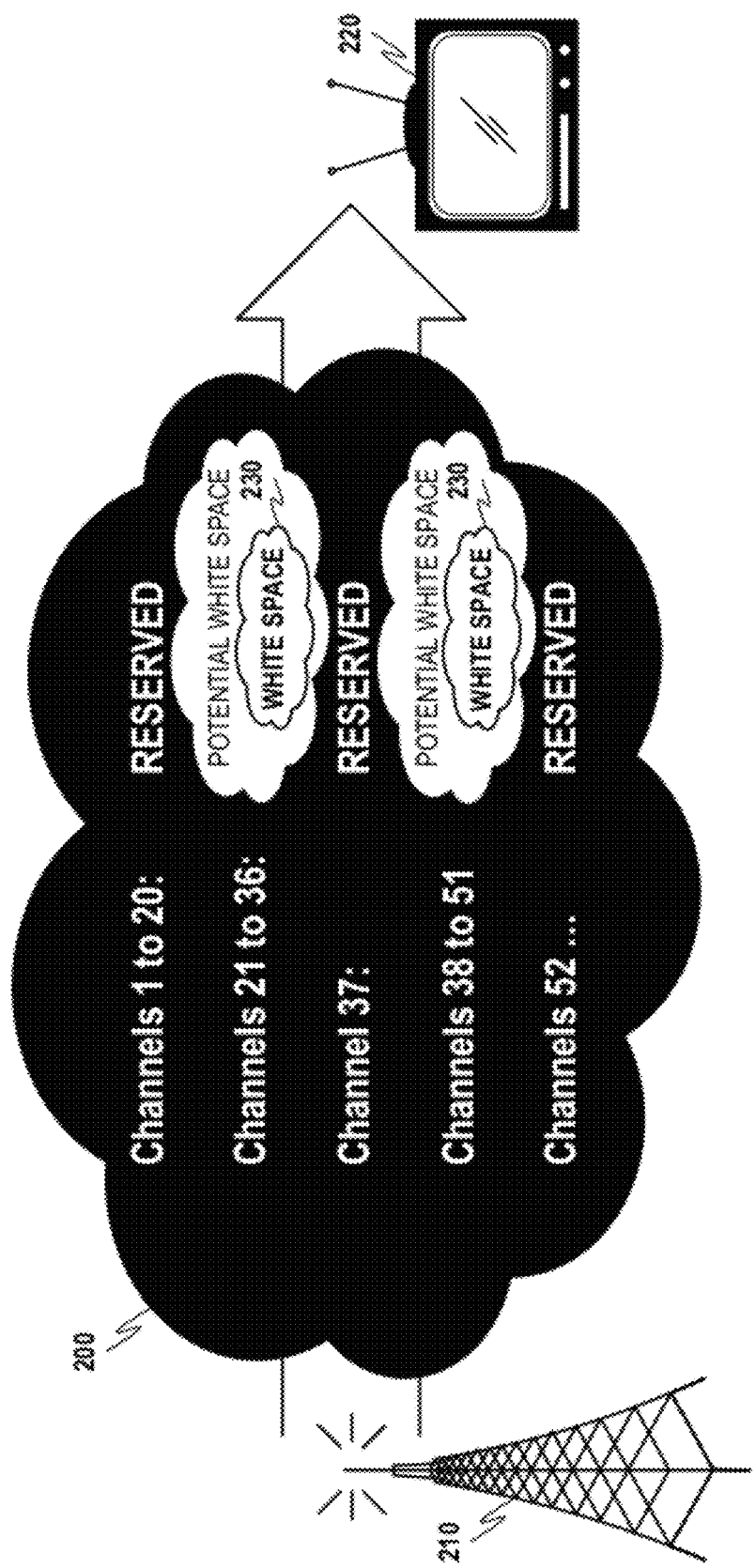

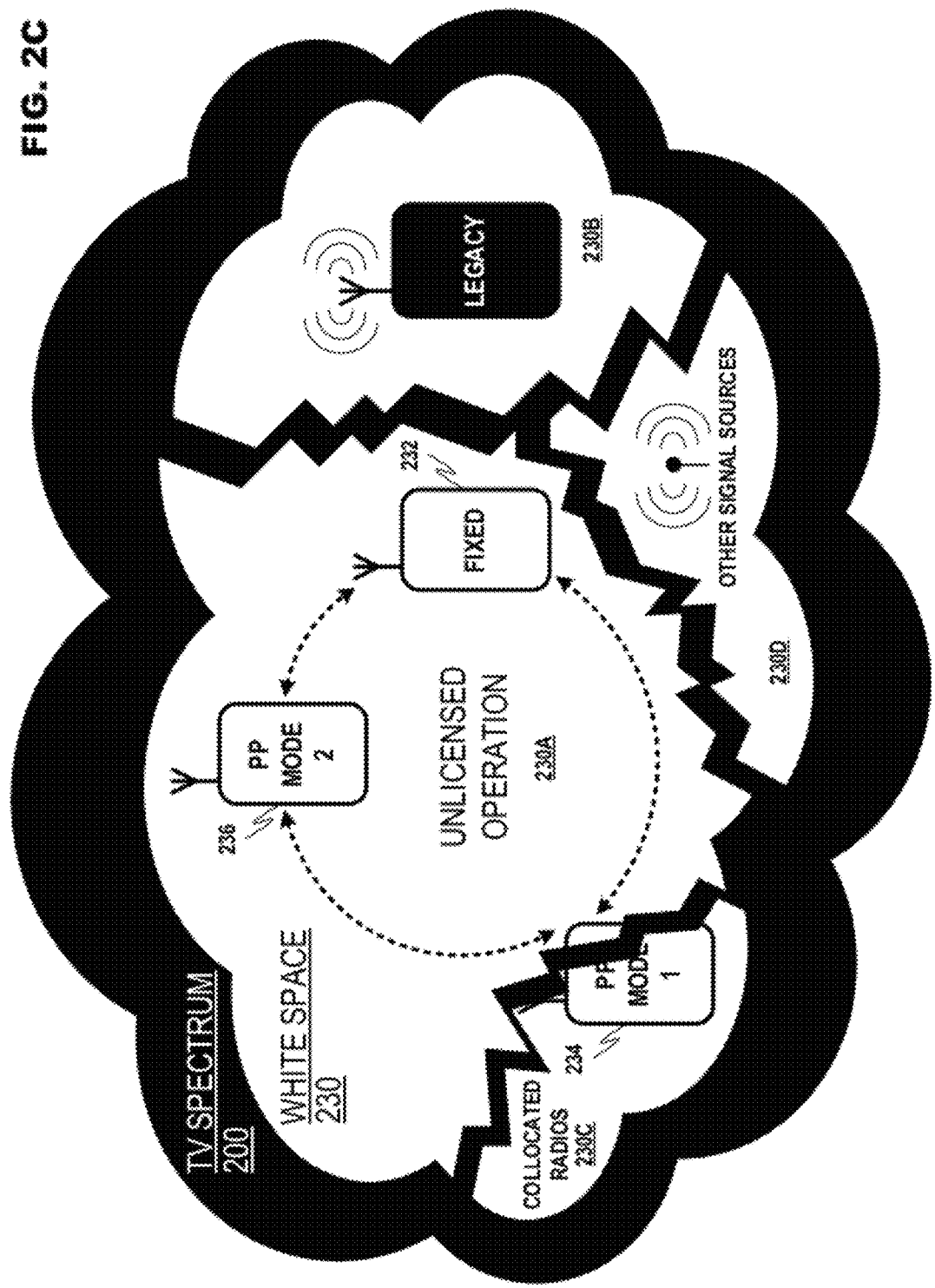

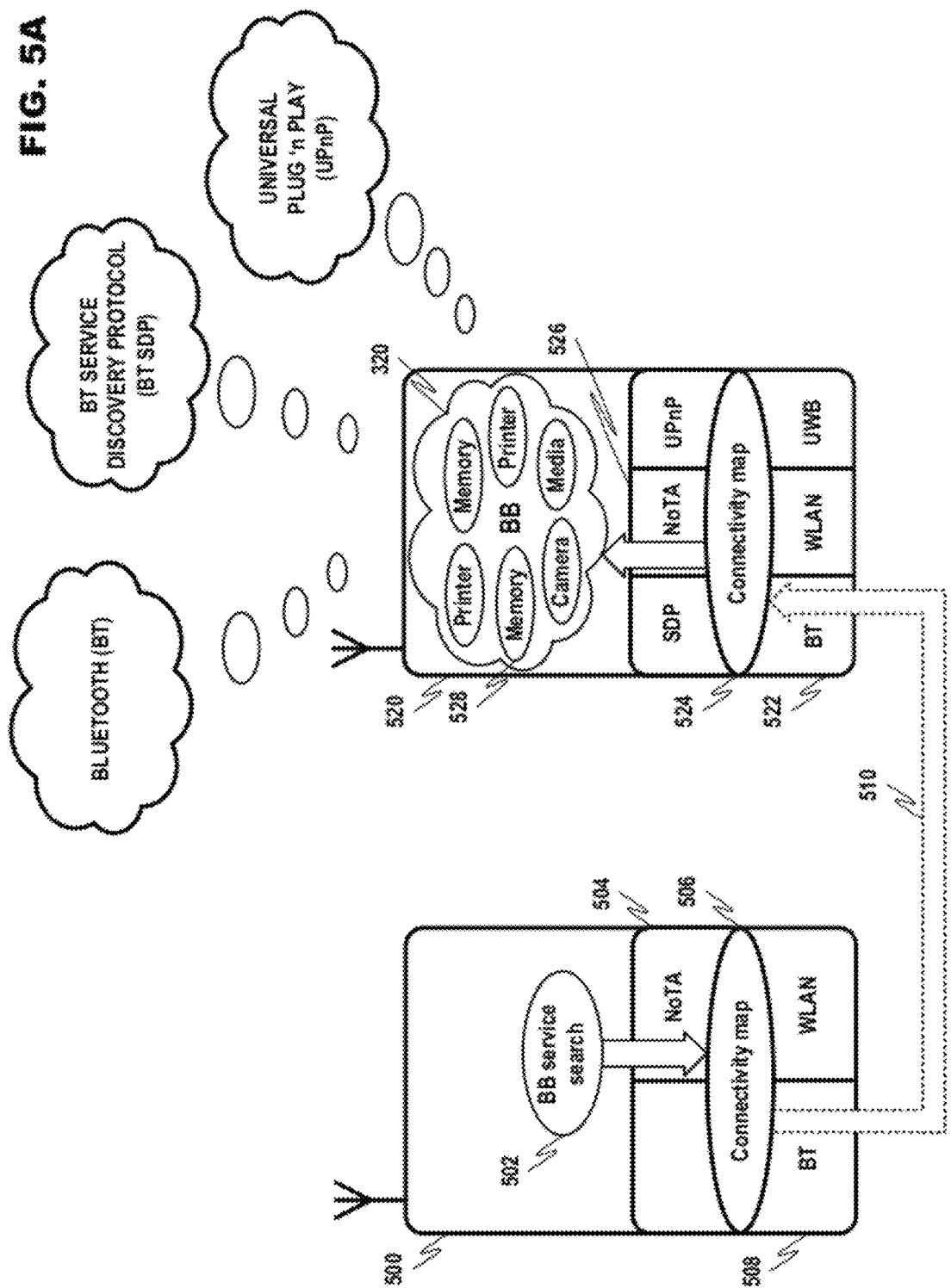

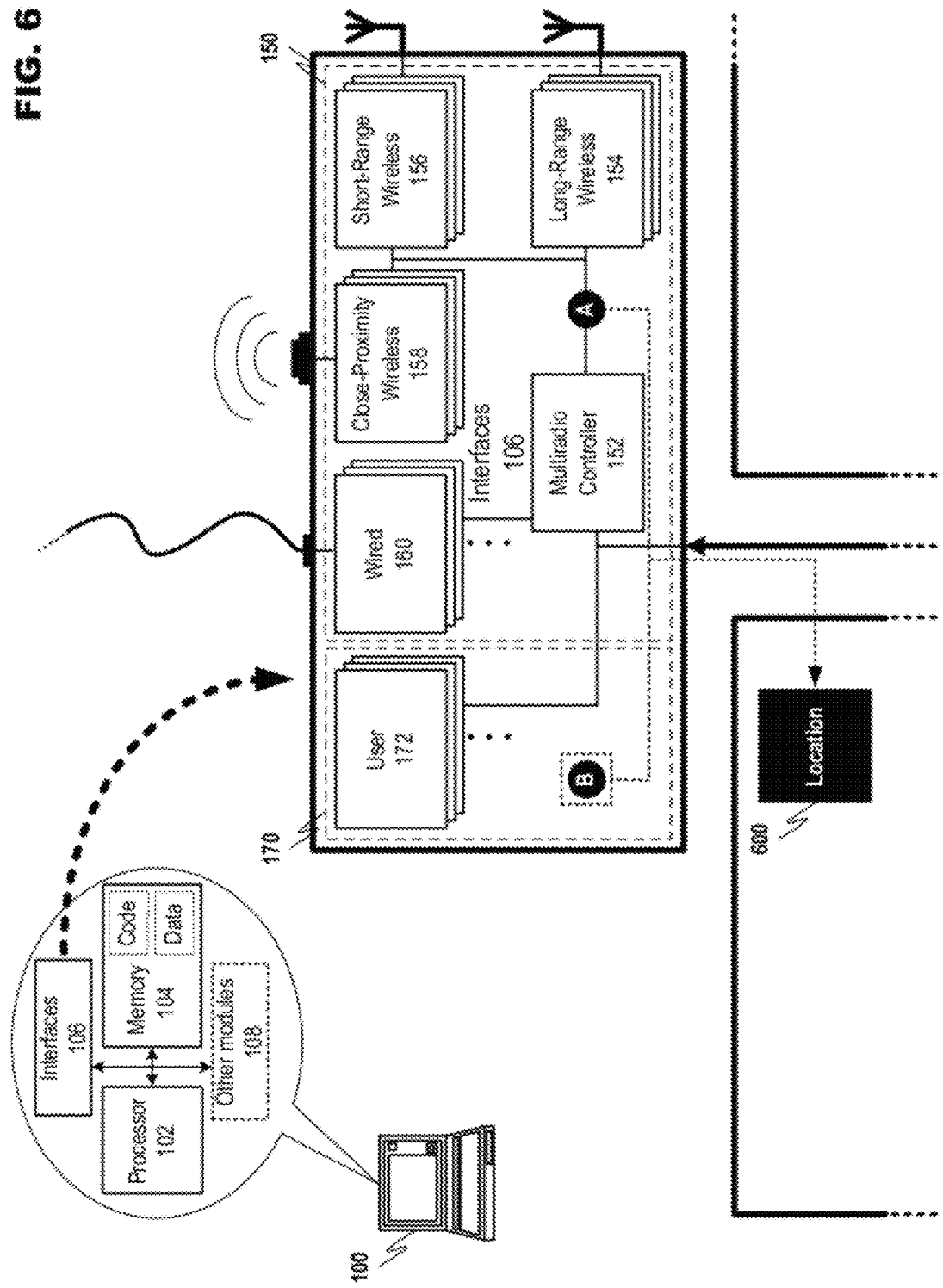

COGNITIVE CONNECTIVITY MANAGEMENT

BACKGROUND

1. Field of Invention:

The present invention relates to wireless communication, and in particular, to expediting apparatus communication configuration based on successful connection information.

2. Background:

Emerging electronic apparatuses may be able to communicate using a multitude of different electronic mediums. For example, these devices may be configured to communicate over multiple wired and/or wireless communication mediums, possibly at the same time. While being empowered with this functionality may be enticing to users, the fact that these modes of communication may operate concurrently means that various considerations must be taken into account in order to deliver a desired, or possibly required, quality of service (QoS) to the user.

For example, apparatus-related considerations may include apparatus processing power, energy limitations, current loading, etc. In other words, just because an apparatus may be able to communicate via multiple communication mediums simultaneously does not necessarily mean that it would be advantageous to do so. The current condition of the apparatus may dictate that such operation is not available or advisable given the QoS desired by the user. Moreover, outside influences like interference caused by other communication signals/electronic devices and operational restrictions (e.g., federal communication standards and rules) may also have to be considered when choosing to operate with a particular communication medium (or mediums).

In addition, the determination of a particular mode of electronic communication will also depend on the location of resources being accessed. For example, access to a resource that resides on another apparatus is at least partially dependent on the modes of communication that are supported by the other apparatus. Often, the communication mediums supported by the other device are determined externally to the transaction at hand (e.g., the user knows the modes of communication that are supported and will opt for a configuration that supports of the these known modes). Otherwise, an apparatus that desires to access resources on another device must engage in a "guess and check" communication process where various communication mediums are attempted until a communication medium that is supported by the participating devices and meets the QoS requirements of the transaction is determined. In terms of portable apparatuses, this process may waste precious resources as part of the investigation, and may end up with the selection of the first available communication configuration that meets the requirements of the transaction, not the most appropriate, or "best" communication configuration in terms of the transaction requirements, the condition of the participating apparatuses, the environment, etc.

SUMMARY

Various example embodiments of the present invention may be directed to a method, apparatus, computer program product and system for configuring communications in an apparatus. An apparatus may determine whether access to resources not in the apparatus is desired. If it is determined that access to the resources is desired, an access request may be sent to a resource manager. The apparatus may then receive connection information in response to the access request, and may then utilize the connection information when selecting a communication configuration usable for accessing the desired resources.

Resource managers may be accessible in various configurations. For example, a resource manager may be accessed through a shared memory communication architecture like a Network on Terminal Architecture (NoTA). Resource managers may also reside on servers that are accessible via a local area network (LAN) or wide area network (WAN) such as the Internet. Regardless of the access configuration, access requests transmitted to the resource manager may comprise at least current location information for the requesting apparatus. In some instances access requests may also include parameters related to the desired resource access connection. In response, connection information received in the apparatus from the resource manager may comprise successful connection configurations corresponding to the current location. In such instances the apparatus may utilize this information in selecting a connection configuration for accessing the desired resources. Alternatively, the connection information may already contain a connection configuration selected by the resource manager for accessing the desired resources.

In accordance with at least one embodiment of the present invention, if it is determined in the apparatus that access to resources accessible via another apparatus is not desired, the device may still interact with the resource manager in order to contribute successful connection information to that already stored in the resource manager. This interaction may include the apparatus determining if successful connection information corresponding to the current location of the apparatus exists in the apparatus, and if this information is available, transmitting the successful connection information to the resource manager. The apparatus may also transmit current location information in addition to the successful connection information.

The foregoing summary includes example embodiments of the present invention that are not intended to be limiting. The above embodiments are used merely to explain selected aspects or steps that may be utilized in implementations of the present invention. However, it is readily apparent that one or more aspects, or steps, pertaining to an example embodiment can be combined with one or more aspects, or steps, of other embodiments to create new embodiments still within the scope of the present invention. Therefore, persons of ordinary skill in the art would appreciate that various embodiments of the present invention may incorporate aspects from other embodiments, or may be implemented in combination with other embodiments.

DESCRIPTION OF DRAWINGS

The invention will be further understood from the following description of various example embodiments, taken in conjunction with appended drawings, in which:

FIG. 2B discloses an example TV White Space operation that may be utilized when implementing the various embodiments of the present invention.

FIG. 2C discloses a further example TV White Space operation that may be utilized when implementing the various embodiments of the present invention.

FIG. 5A discloses an example of communication to a billboard utilizing a connection map in accordance with at least one embodiment of the present invention.

FIG. 6 discloses an example of location-based functionality that may be utilized when implementing various embodiments of the present invention.

DESCRIPTION OF EXAMPLE EMBODIMENTS

Figure 1A:
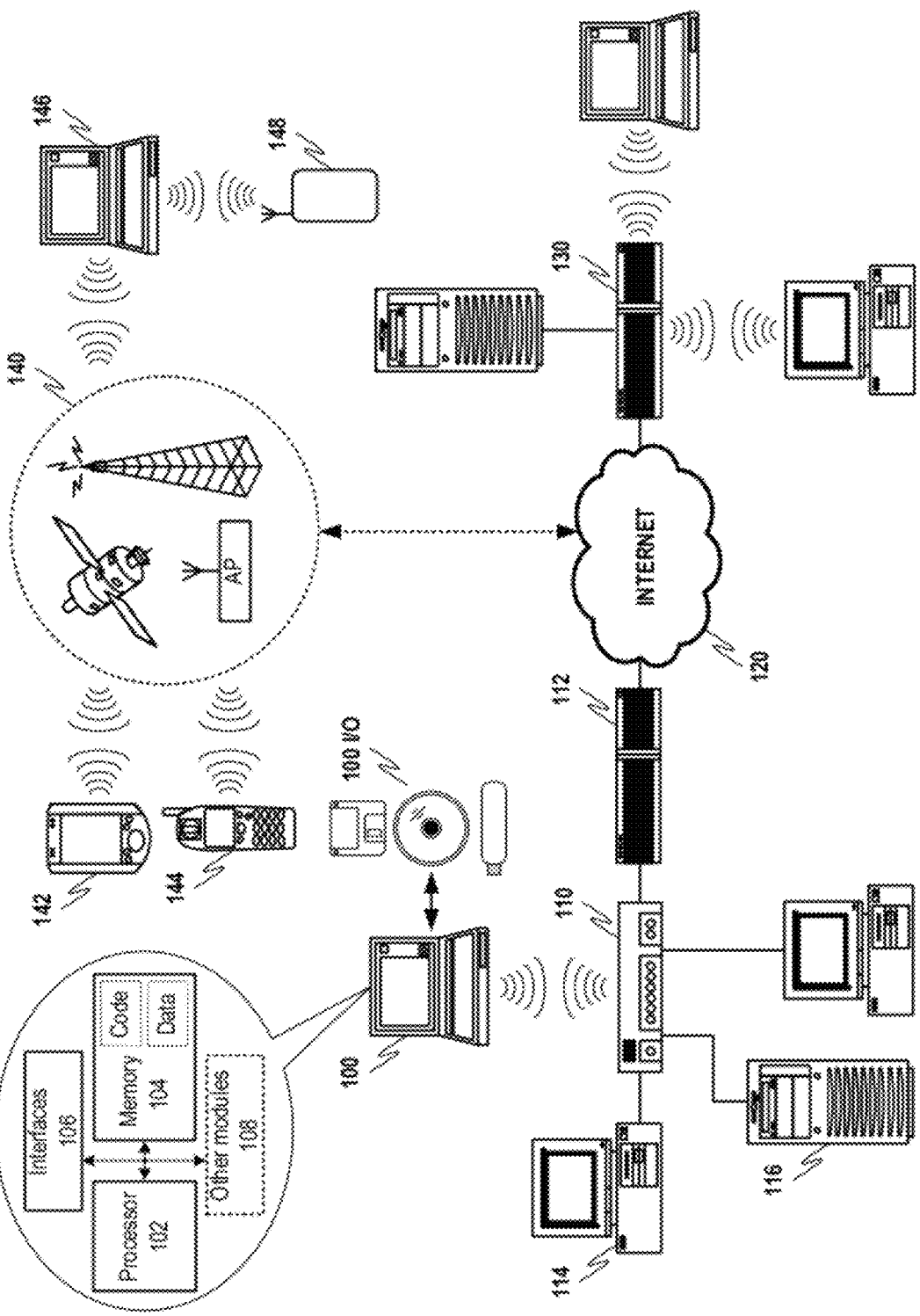
FIG. 1A discloses example apparatuses, systems, configurations, etc. that may be utilized when implementing the various embodiments of the present invention FIG. 1B discloses further detail regarding an example apparatus configuration that may be utilized when implementing the various embodiments of the present invention.

While the invention has been described below in terms of a multitude of example embodiments, various changes can be made therein without departing from the spirit and scope of the invention, as described in the appended claims.

I. Example System with which Embodiments of the Present Invention May be Implemented An example of a system that is usable for implementing various embodiments of the present invention is disclosed in FIG. 1. The system comprises elements that may be included in, or omitted from, configurations depending, for example, on the requirements of a particular application, and therefore, is not intended to limit present invention in any manner.

Computing device 100 may be, for example, a laptop computer. Elements that represent basic example components comprising functional elements in computing device 100 are disclosed at 102-108. Processor 102 may include one or more devices configured to execute instructions. In at least one scenario, the execution of program code (e.g., groups of computer-executable instructions stored in a memory) by processor 102 may cause computing device 100 to perform processes including, for example, method steps that may result in data, events or other output activities. Processor 102 may be a dedicated (e.g., monolithic) microprocessor device, or may be part of a composite device such as an ASIC, gate array, multi-chip module (MCM), etc.

Processor 102 may be electronically coupled to other functional components in computing device 100 via a wired or wireless bus. For example, processor 102 may access memory 104 in order to obtain stored information (e.g., program code, data, etc.) for use during processing. Memory 104 may generally include removable or imbedded memories that operate in a static or dynamic mode. Further, memory 104 may include read only memories (ROM), random access memories (RAM), and rewritable memories such as Flash, EPROM, etc. Code may include any interpreted or compiled computer language including computer-executable instructions. The code and/or data may be used to create software modules such as operating systems, communication utilities, user interfaces, more specialized program modules, etc.

One or more interfaces 106 may also be coupled to various components in computing device 100. These interfaces may allow for inter-apparatus communication (e.g., a software or protocol interface), apparatus-to-apparatus communication (e.g., a wired or wireless communication interface) and even apparatus to user communication (e.g., a user interface). These interfaces allow components within computing device 100, other apparatuses and users to interact with computing device 100. Further, interfaces 106 may communicate machine-readable data, such as electronic, magnetic or optical signals embodied on a computer readable medium, or may translate the actions of users into activity that may be understood by computing device 100 (e.g., typing on a keyboard, speaking into the receiver of a cellular handset, touching an icon on a touch screen device, etc.). Interfaces 106 may further allow processor 102 and/or memory 104 to interact with other modules 108. For example, other modules 108 may comprise one or more components supporting more specialized functionality provided by computing device 100.

Computing device 100 may interact with other apparatuses via various networks as further shown in FIG. 1. For example, hub 110 may provide wired and/or wireless support to devices such as computer 114 and server 116. Hub 110 may be further coupled to router 112 that allows devices on the local area network (LAN) to interact with devices on a wide area network (WAN, such as Internet 120). In such a scenario, another router 130 may transmit information to, and receive information from, router 112 so that devices on each LAN may communicate. Further, all of the components depicted in this example configuration are not necessary for implementation of the present invention. For example, in the LAN serviced by router 130 no additional hub is needed since this functionality may be supported by the router.

Further, interaction with remote devices may be supported by various providers of short and long range wireless communication 140. These providers may use, for example, long range terrestrial-based cellular systems and satellite communication, and/or short-range wireless access points in order to provide a wireless connection to Internet 120. For example, personal digital assistant (PDA) 142 and cellular handset 144 may communicate with computing device 100 via an Internet connection provided by a provider of wireless communication 140. Similar functionality may be included in devices, such as laptop computer 146, in the form of hardware and/or software resources configured to allow short and/or long range wireless communication. Further, any or all of the disclosed apparatuses may engage in direct interaction, such as in the short-range wireless interaction shown between laptop 146 and wireless-enabled apparatus 148. Example wireless enabled apparatuses 148 may range from more complex standalone wireless-enabled devices to peripheral devices for supporting functionality in apparatuses like laptop 146.

Figure 1B:
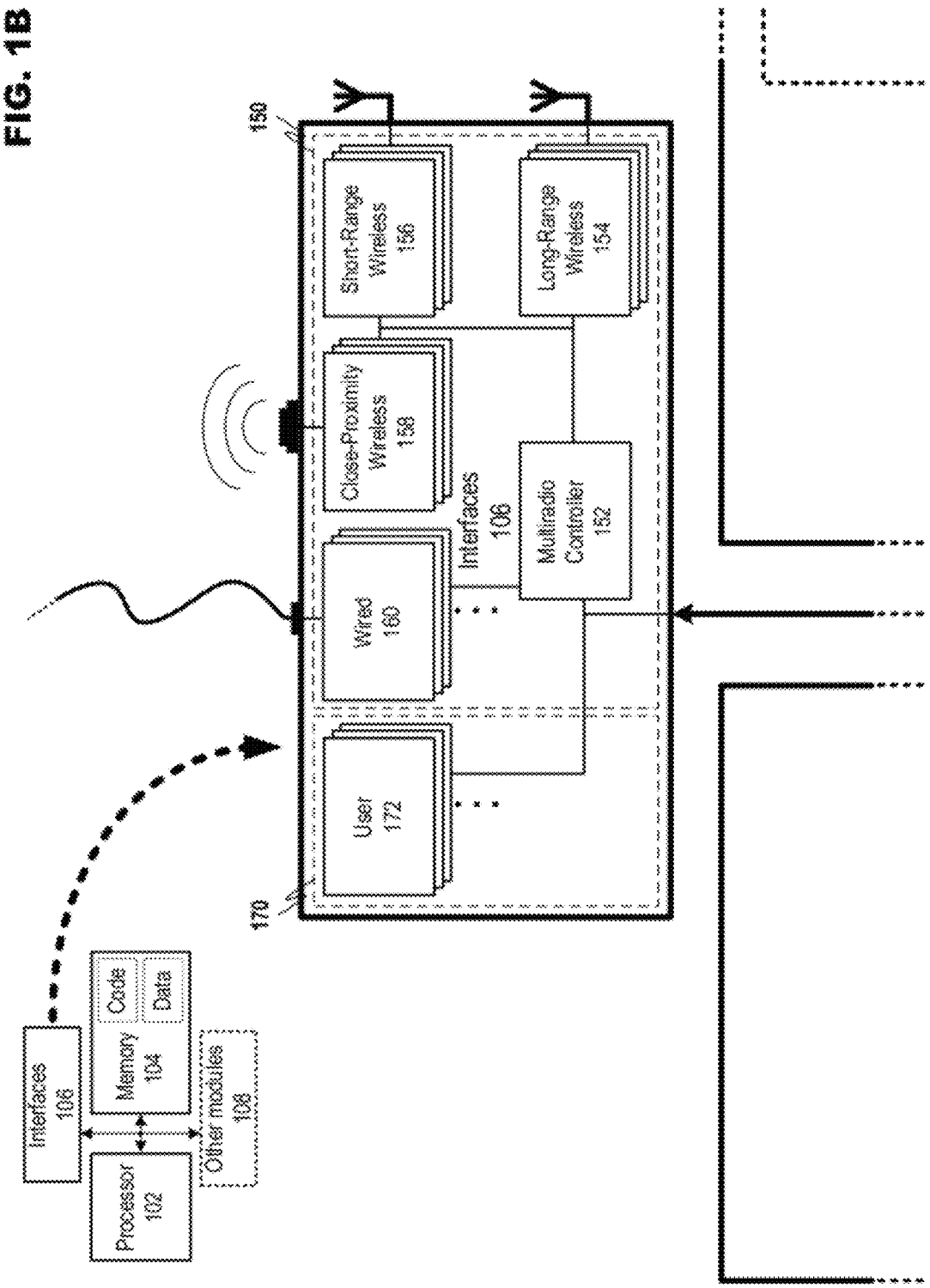

Further detail regarding example interface component 106 disclosed with respect to computing device 100 in FIG. 1 is now discussed regarding FIG. 1B. As previously set forth, interfaces 106 may include interfaces both for communicating data to computing apparatus 100 (e.g., as identified at 150) and other types of interfaces 158 including, for example, user interface 172. A representative group of apparatus-level interfaces is disclosed at 150. For example, multiradio controller 152 may manage the interoperation of long range wireless interfaces 154 (e.g., cellular voice and data networks), short-range wireless interfaces 156 (e.g., Bluetooth and WLAN networks), close-proximity wireless interfaces (e.g., for interactions where electronic, magnetic, electromagnetic and optical information scanners interpret machine-readable data), wired interfaces 160 (e.g., Ethernet), etc. The example interfaces shown in FIG. 1B have been presented only for the sake of explanation herein, and thus, are not intended to limit the various embodiments of the present invention to utilization of any particular interface. Embodiments of the present invention may also utilize interfaces that are not specifically identified in FIG. 1B.

Multiradio controller 152 may manage the operation of some or all of interfaces 154-160. For example, multiradio controller 152 may prevent interfaces that could interfere with each other from operating at the same time by allocating specific time periods during which each interface is permitted to operate. Further, multiradio controller 152 may be able to process environmental information, such as sensed interference in the operational environment, to select an interface that will be more resilient to the interference. These multiradio control scenarios are not meant to encompass an exhaustive list of possible control functionality, but are merely given as examples of how multiradio controller 152 may interact with interfaces 154-160 in FIG. 1B.

II. Example Wireless Environment

Initially, while this disclosure makes specific reference to implementing various embodiments of the present invention in particular operational environments, these operational environments have been used only for the sake of explanation herein. Systems like TV White Space (TVWS) coexistence management and Network on Terminal Architecture (NoTA) are meant only to provide a frame of reference from which the concepts that make up the present invention may be understood, and are not meant to limit implementation to certain situations.

Figure 2A:
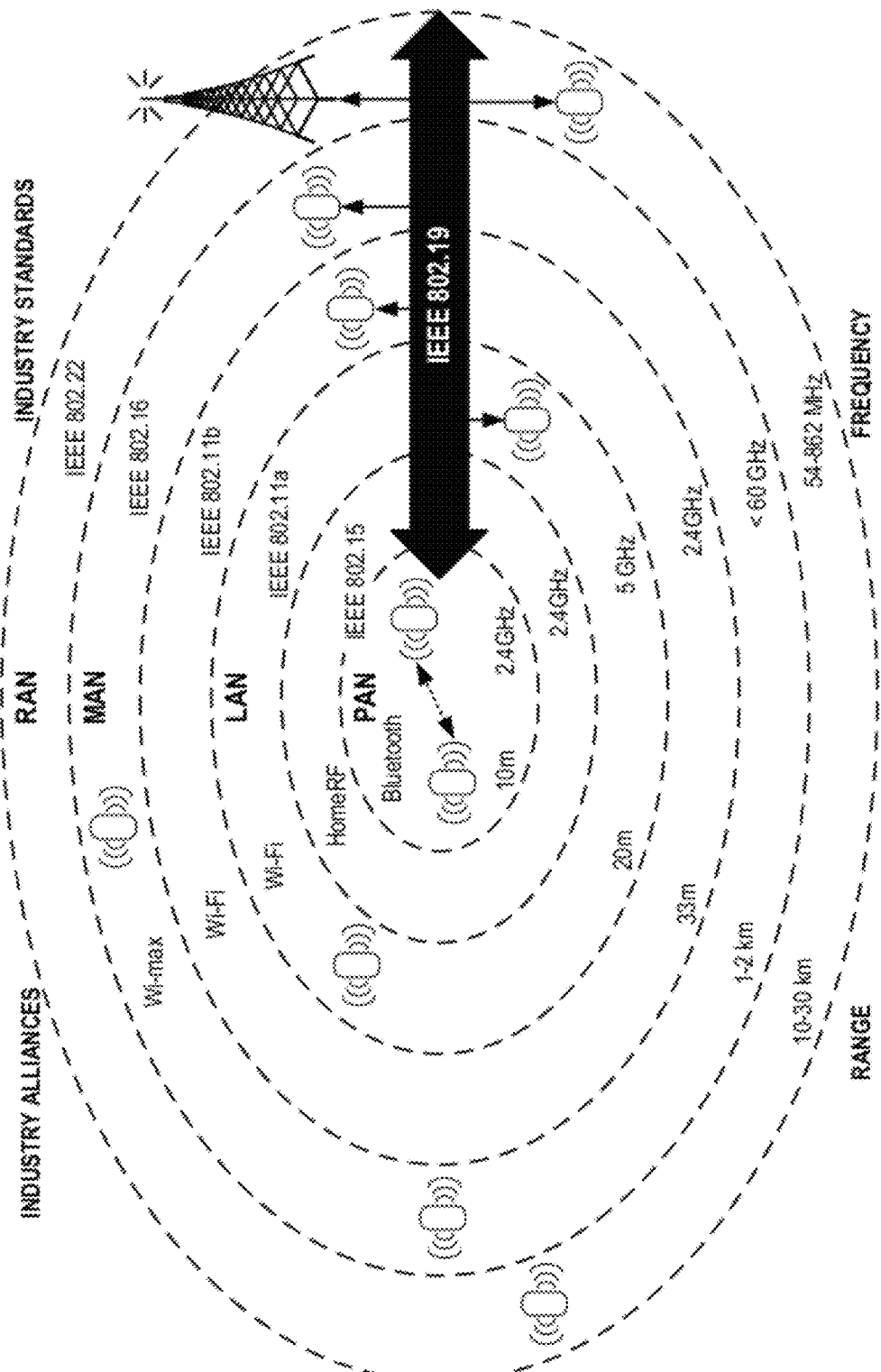
FIG. 2A discloses an example of IEEE 802.19 wireless coexistence architecture that may be utilized when implementing the various embodiments of the present invention.

An example wireless environment in which example embodiments of the present invention may operate is disclosed in FIG. 2A. The various zones of operation depicted in FIG. 2A correspond to different network categories, the characteristics of each network category, and the names of specific implementations of each network category, is also provided for the sake of explanation herein. For example, apparatuses that operate within extremely close proximity of each (e.g., within 10 m) may form a personal area network (PAN). A Bluetooth Piconet is an example of a PAN that is specified by the Bluetooth special interest group (SIG). In addition, the Institute of Electrical and Electronics Engineers (IEEE) has established an industry standard for apparatuses operating in a PAN under 802.15 including mediums such as Zigbee, UWB, etc. Devices interacting in a network over further distances may be deemed to constitute a local area network (LAN). IEEE 802.11a, b, g and n are commonly known standards for device operation within the 10-100 m range, as many apparatuses now on the market operate using wireless local area networking (WLAN) to interact with "Wi-Fi" hotspots in order to access wide area networks (WAN) like the Internet. As shown, the various wireless network technologies in the LAN category may share operational frequencies with PAN devices.

As the distance between apparatuses increases the classification of the type of network changes. A metropolitan area network (MAN) may include apparatuses that are 1-2 km apart. This classification of network would include emerging Wi-Max technologies operating in accordance with the IEEE 802.16 standard. Larger networks (e.g., where networked apparatuses are 10-30 km apart) would fall into the regional area network (RAN) category governed by IEEE 802.22 standard. Again, frequency ranges for devices operating in a RAN or MAN may, in some instances, overlap the frequencies commonly employed by apparatuses operating in a LAN or PAN, depending on the technology.

The example of FIG. 2A illustrates a situation where available bandwidth may be occupied by many different participants. Such situations may become problematic as wireless technologies having similar operating characteristics become more accessible to users. With the wireless communication load of so many participants packed into limited available bandwidth, interference is not only foreseeable, it becomes unavoidable. The collision of signals being transmitted in overlapping frequency ranges negatively impacts quality of service (QoS) for all devices. In an effort to avoid this situation, the IEEE formed the 802.19 Wireless Coexistence Technical Advisory Group (TAG) within the IEEE 802 LAN/MAN Standards Committee. The TAG is concerned with coexistence between unlicensed wireless networks such as disclosed in FIG. 2A. The TAG helps the standards committees to design avoidance schemes that allow networks to operate in close proximity and in similar bandwidth while minimizing interference.

Figure 2D:
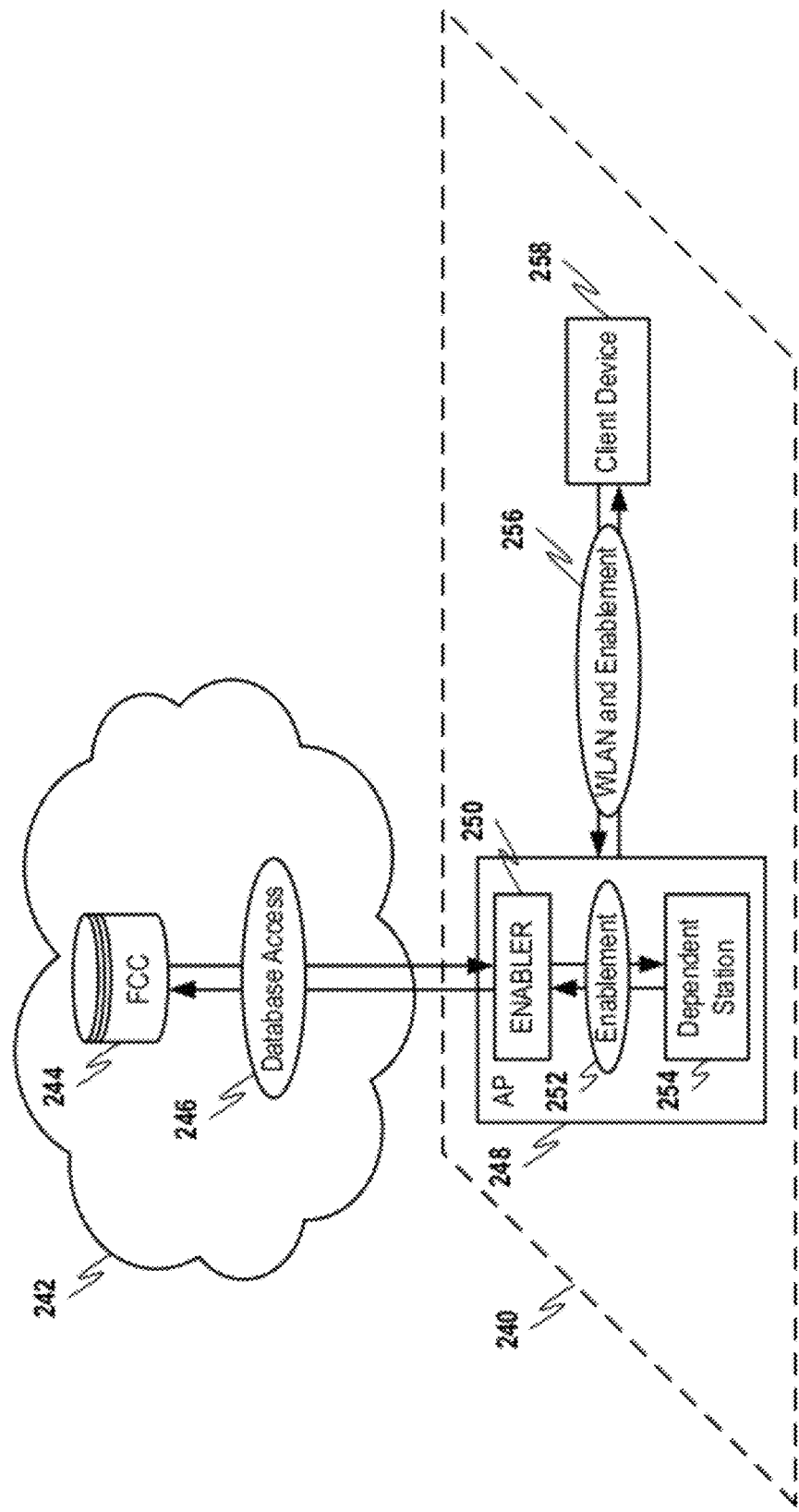
FIG. 2D discloses an example of TV White Space enablement that may be utilized when implementing the various embodiments of the present invention.

An example of how coexistence may be managed when different apparatuses are operating within the same or similar bandwidth is shown in FIG. 2B-D in terms of a rudimentary white space system. Bandwidth 200 may have originally been licensed to broadcasters 210 for use in television programming. Bandwidth 200 may be separated into channels that are used by broadcasters 210 to send programming to TV 220. For example, each channel may be used by a broadcaster 210 to transmit audio/visual programming to TV 220, may be reserved for signals being transmitted by wireless microphones, etc. However, some of bandwidth 200 that is licensed for TV programming may remain unused (e.g., there is no broadcaster using the channel, other signal sources may create interference within the frequency range that defines a channel, etc.). This unused space is shown in FIG. 2 as potential space. White space 230 may therefore comprise a portion of the potential white space that may be reallocated for other uses, such as unlicensed short-range wireless communication (e.g., for supporting PAN and LAN operation). TV white space (TVWS) in the U.S. may comprise TV channels 21-51, 470 MHz to 698 MHz, excluding channel 37. As a result, channels that are not being used within the range of channels 21 to 36 and/or channels 38 to 51 may be reallocated. There may also be unused VHF and UHF channels in which TVWS operation is permitted, but these channels are currently reserved for fixed-to-fixed apparatus communication only.

Now referring to FIG. 2C, the example of white space 230 as an environment in which apparatuses may interact is explored further. In TVWS network terminology there may be two categories of apparatus: fixed and personal/portable. Fixed apparatuses 232 are stationary, and thus, have a constant position over time. Personal/portable devices may be capable of moving, so their location may vary over time. Furthermore, personal/portable devices are categorized into PP Mode I apparatuses 234 and PP Mode II apparatuses 236. PP Mode II devices 236 can initiate networks (e.g., they can serve as access points in WLAN-type networks) as a master device. PP Mode I devices 234 can only operate as clients of TVWS networks, which may be controlled by either fixed apparatus 232 or PP Mode II device 236. Both fixed apparatuses 232 and personal/portable Mode II devices 236 may utilize spectrum sensing and database access to determine whether a channel is occupied by a primary user. "Special" type apparatuses (not pictured) may also be defined in TVWS networks. Such special apparatuses may be portable and may rely only on spectrum sensing to identify occupied channels.

Ideally, apparatuses 232, 234 and 236, as disclosed in FIG. 2C, may interact freely via wireless communication as long as they remain within the frequency range established for white space 230. However, in practice white space 230 may not be an ideal operational environment. As shown in FIG. 2C, many signal sources may exist within the frequency range being reallocated for unlicensed communication, and as a result there may be many opportunities for interference to arise. Initially, intra-apparatus interference (e.g., interference from concurrent activities occurring in the same apparatus) may exist. Co-located coexistence interference 230C may occur in apparatuses containing multiple radios transmitting in proximate frequency bands, or that may otherwise still experience quality problems during simultaneous operation due to, for example, harmonic or inter-modulation interference. In this instance the multiple radios may cause interference between themselves. This is especially a problem for mobile cellular handsets and other small factor devices since the physical distance between antennas is insubstantial (e.g., closer antennas yield increased interference) and even the smallest leakage power can result in significant performance degradation. Transmission power level may also contribute to intra-apparatus interference, which may vary based radio type (e.g., cellular radio ~2 W is stronger than short-range unlicensed radio ~100 mW).

The QoS delivered by apparatuses may also depend on the resistance of the radio technology being employed to co-located and environmental interference. For example, severe co-located interference may occur when a high power radio transmits at the same time when low power radio is receiving. For example, substantial interference may occur in devices supporting both Long Term Evolution (LTE) operating at 700 MHz and TVWS technology using wireless local area network (WLAN) technology where the TVWS channel exists at high end of TV band (e.g., ~690 MHz). Other combinations may also prove problematic. For example, other signal sources 230D may comprise apparatuses whose signals are present within the operational environment but are not part of the short-range unlicensed wireless network formed as disclosed at 230A. Other signal sources 230D may comprise electronic or electromechanical apparatuses whose operation causes electromagnetic field (EMF) interference in the operational environment. Moreover, wireless-enabled apparatuses that operate in close proximity but are not participating in unlicensed operation 230A may also contribute to signal traffic.

Since the release of the FCC rule for Unlicensed Operation in the TV Broadcast Bands, TVWS spectrum is officially available in the U.S. for short-range wireless operation. TV band devices (TVBD) may operate in channels not being occupied by legacy users 230B, which may include licensed TV broadcasters and wireless microphones. More specifically, the FCC is currently requiring that devices must operate using a −114 dBm detection sensitivity, which may be subject to change depending on various criteria such as updated wireless management regulations, changes in environment (traffic), etc. Wireless local area networking (WLAN) is one of the key technologies that is both suitable and desirable for TVWS spectrum. Apart from providing additional spectrum for supporting the operation of an expanding number of WLAN apparatuses emerging in the marketplace, another substantial advantage is that better propagation characteristics exist in the VHF or lower UHF TV bands, which can provide longer range than that is typically possible for existing WLAN systems operating in 2.4 or 5 GHz band.

The FCC regulations establish strict protection of existing primary services that operate in these channels. Apparatuses seeking to utilize the bandwidth for unlicensed short-range wireless communication are first required to seek permission by accessing databases that provide allowed operating channels/frequencies in accordance with reported apparatus location, to perform sensing to avoid interfering with legacy apparatus operation and to operate utilizing specified maximum transmit power levels for various device categories. As mentioned above, the FCC rules include two categories of TVBD devices: Fixed TVBD which are installed to a specific location and allowed to have a maximum transmit power of 4 W equivalent isotropically radiated power (EIRP), and personal/portable TVBD, which are restricted to a 100 mW EIRP maximum. There are currently two operational modes defined for TVBD: master mode and client mode. Fixed TVBD are required to include positioning and database access capabilities, and thus can operate as master mode stations. On the other hand, personal/portable devices can either operate in master mode (mode II operation) when equipped with positioning/database access, or operate in client mode (Mode I operation) under control of a master mode device where they must receive signals from a fixed TVBD or Mode II personal/portable TVBD before they can initiate transmissions in a channel frequency and will operate under control of its master device during this operation.

Existing thought on how to best implement WLAN in TVWS has centered around leveraging architecture and/or strategies set forth in the IEEE 802.11y revision of WLAN for use in WLAN implemented in TVWS, or IEEE 802.11af, which is currently being discussed at the IEEE task group level. FIG. 2D discloses a simple scenario of enabling access point (AP) 248. Area 240 defines a certain geographic location in which TVWS operation is permitted. At least AP 248 and client device 258 currently reside in area 240. In the course of seeking enablement, one or both of the apparatuses in area 240 may interact with FCC database 244, which may be situated remotely from area 240 as represented by cloud 242. For example, FCC database 244 may represent one or more servers that form a centralized database that provides allowed channel information to TVBD across the U.S., and thus, portions of FCC database 244 may reside in different locations that may all be accessible by a wide area network (WAN) such as the Internet.

AP 248 may comprise enabler 250 and dependent station 254. Enabler 250 may be a logical entity, meaning that enabler 250 may exist totally as software or as a combination of hardware and software, that is tasked with providing enablement services to other TVBD in area 240 like dependent station 254 and client device 258. As a prerequisite for performing this task, enabler 250 must first obtain allowed channel information for area 240 from FCC database 244, which is represented in FIG. 2D by database access 246. The frequency of database access 246 may be defined in the regulations promulgated by the FCC (e.g., at least once per day) in order to obtain updated allowed channel information from FCC database 244. Enabler 250 may then enable (send allowed channel and/or configuration information to) dependent station 254 in AP 248 as shown at 252. Enablement 252 enables dependent station 254 to operate (e.g., perform beaconing) in area 240, which in turn allows AP 248 to advertise its presence and engage in wireless communication with other devices in area 240, such as client device 258. As WLAN is being utilized for the sake of example in FIG. 2D, a WLAN connection 256 may be established between AP 248 and client device 258. In a manner similar to enablement 252 of dependent station 254, client device 258 may communicate wirelessly over WLAN connection 256 with enabler 250 (via AP 248) in order to perform enablement operations, which enables client device 258 to participate in TVWS communication while within the bounds of area 240. The example of FIG. 2D demonstrates that simple dynamic station enablement (DSE), as set forth in 802.11y, may also be employed when operating WLAN in TVWS areas without incurring any problems when additional regulatory requirements including spectrum sensing for allowed channels, enablement and in-service monitoring for legacy apparatus operation are performed.

III. Example Network on Terminal (NoTA) Architecture

Figure 3:
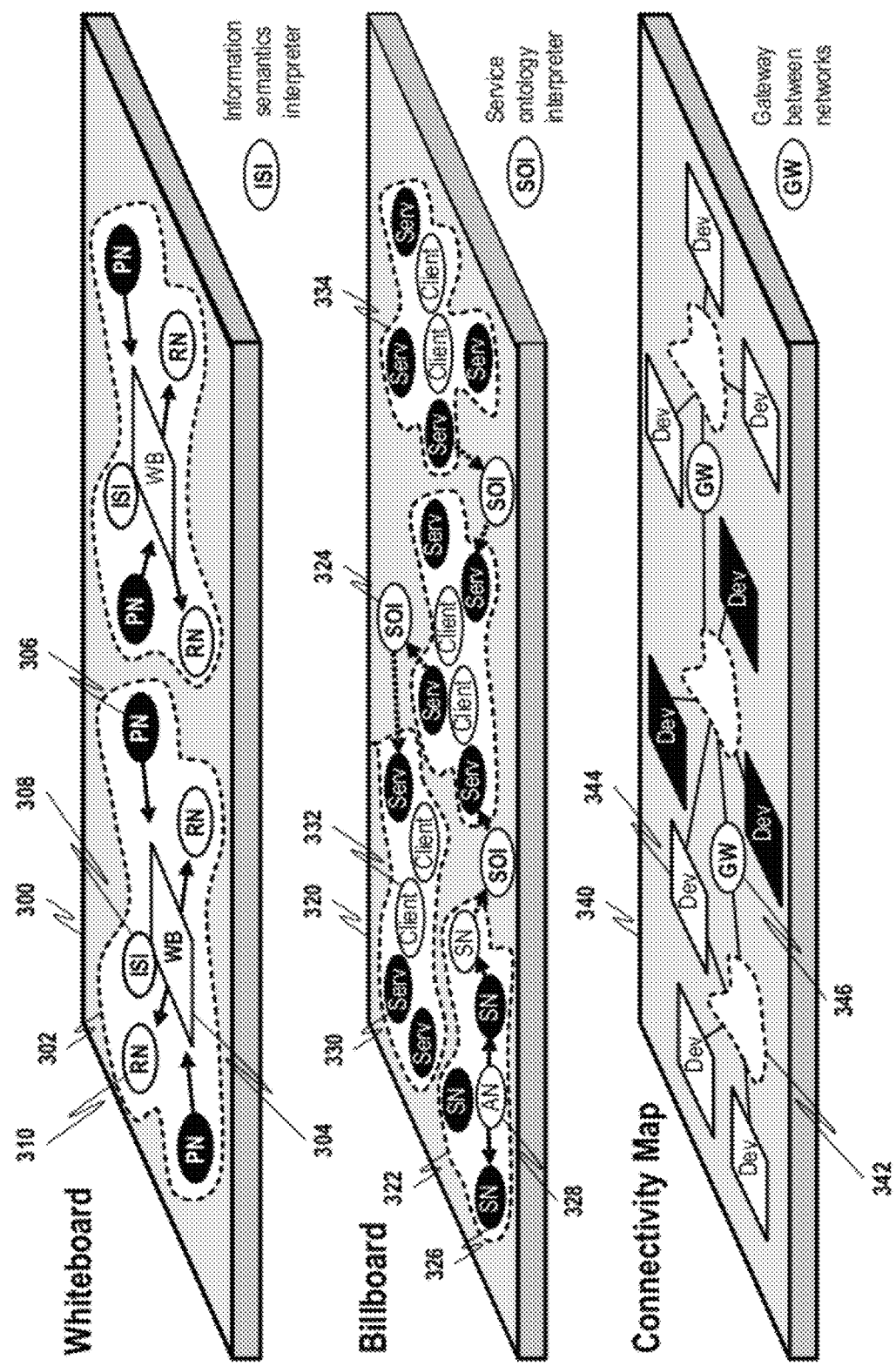
FIG. 3 discloses an example of the various levels of operation in Network on Terminal Architecture in accordance with at least one embodiment of the present invention.

While FIG. 2A-2D disclose an example coexistence management system in which at least one embodiment of the present invention may be implemented, the various embodiments of the invention are not limited to this configuration. FIG. 3-5B disclose an alternative example of a coexistence management system that is also compatible with the various concepts that make up the present invention. A diagram setting forth a multi-tier Network on Terminal Architecture (NoTA) is shown in FIG. 3. In its most basic form, NoTA may provide a transport-independent platform (e.g., a shared memory space) for facilitating access to resources residing on the various apparatuses participating in the NoTA. Whiteboard 300 is the highest level of operation in the architecture. At this level, operational groups 302 may be formed including whiteboards 304 and various application nodes. Application nodes may correspond to various applications existing on a plurality of wireless communication devices, and may be utilized to exchange information between these applications, for example, by placing data into, and removing data from, whiteboard 304. For example, the types of nodes may comprise proactive nodes (PN) 306 that are utilized to place information into whiteboard 304, reactive nodes (RN) 310 are utilized to take information from whiteboard 304. Information semantics interpreter (ISI) 308 may be utilized to link different whiteboards together. Utilizing these constructs, Whiteboard 304 may provide a standardized means for application interaction that overcomes many incompatibilities.

Billboard level 320 facilitates interaction between services available on the one or more devices. For instance, Billboard level 320 provides sharing of service-related information (e.g., service identification information, functionality, etc.), as well as information that may be necessary when accessing and/or utilizing each service. Services 330 and clients 332 that may utilize these services may be organized in service domains 322. In at least one scenario, service domains 322 may correspond to a particular protocol, such as Universal Plug and Play (UPnP), Bluetooth Service Discovery Protocol (BT SDP), Bonjour, etc. In each service domain 322, services 330 may be represented by service nodes (SN) 326, and likewise, application nodes (AN) 328 may correspond to applications. Further, service domains 322 may interact utilizing service ontology interpreters (SOI) 324. SOI 324 allows service domains 322 to interact with other service domains 322 in the service level, even if service domains 322 reside on different wirelessly-linked devices (e.g., to provide access information to other service domains 322).

Connectivity map 340 may define available connection methods, possible routing methods and topology for the apparatuses that are participating in whiteboard 300 and billboard 320. In at least one embodiment of the present invention, devices 344 may be linked in directly connected groups 342. Examples of directly connected groups of devices (Dev) 342 may include devices connected via a Bluetooth piconet, a WLAN network, a wUSB wireless link, etc. Each directly connected group of devices 342 may further be linked by gateways (GW) 346.

Figure 4A:
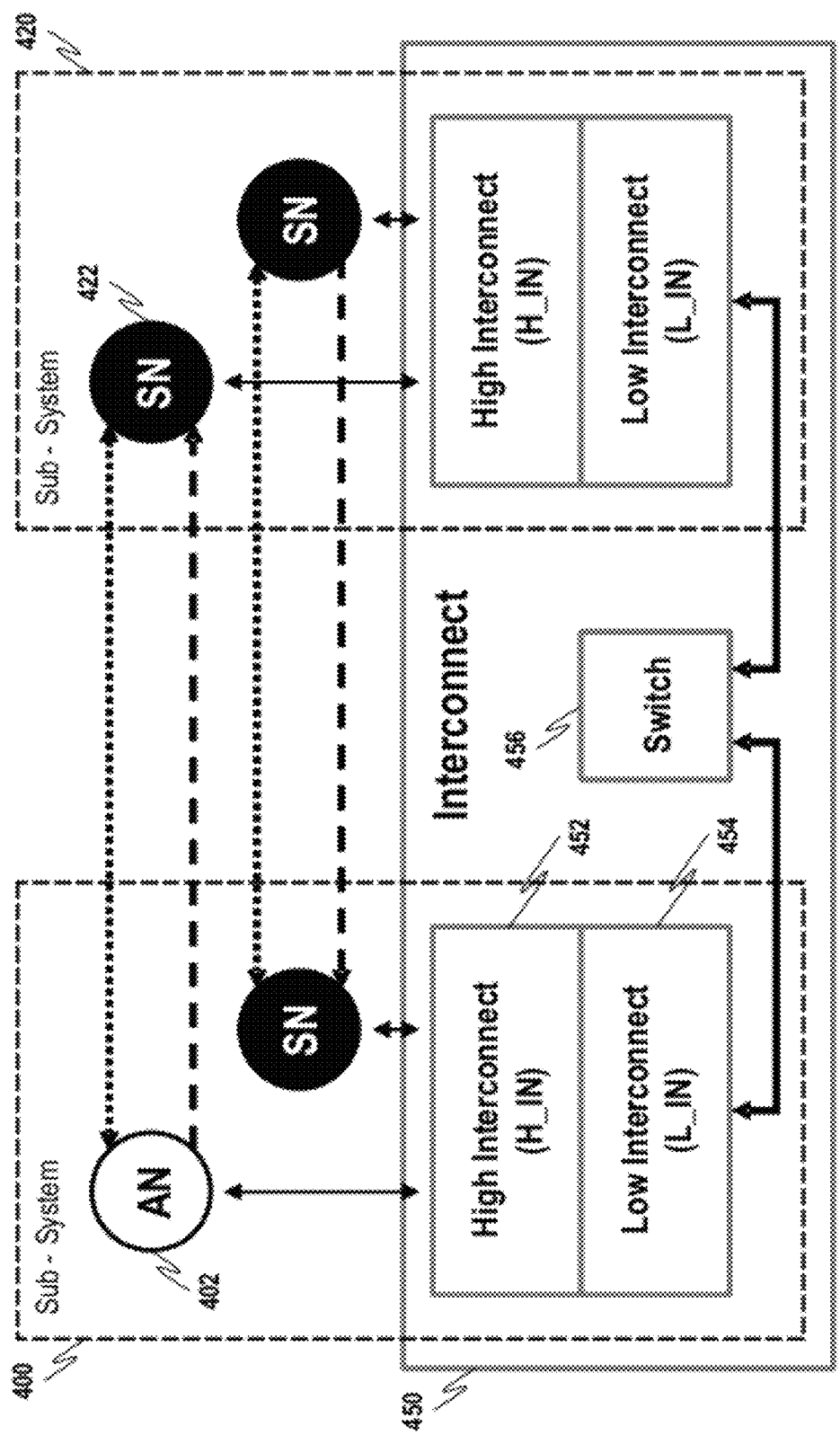
FIG. 4A discloses an example of communication flow in Network on Terminal Architecture in accordance with at least one embodiment of the present invention.

As set forth above, the interaction between the various structures set forth in FIG. 3 may be transport-independent, meaning that links between apparatuses may be established for facilitating resource access without the need for higher-level (e.g., application) visibility into the actual communication configuration. Information may be conveyed from provider to consumer, in accordance with a desired QoS, without these entities having to configure a connection that will deliver the required performance. FIG. 4A discloses an example of a communication structure that may deliver such transparency. NoTA may be configured as multiple subsystems (e.g., 400 and 420) coupled by interconnect 450. NoTA interconnect 450 may comprise two layers: High Interconnect (H_IN) layer 452 and Low Interconnect (L_IN) layer 454 that are coupled by switch 456. Low interconnect layer 454 may include ISO/OSI layers L1-L4 and may provide transport socket type interface upwards. High Interconnect layer 452 may act as middleware between L_IN 454 and the higher level Application nodes (AN) 402 and Service nodes (SN) 422 residing in subsystems 400 and 420, respectively. H_IN 452 functionality may provide client nodes (AN 402 or SN 422) direct access to services (without having to disclose the location of the latter). Communication may be connection-oriented, meaning that before any service or data communication takes place, connection setup procedures would need to be carried out. Security features may also be added to countermeasure identified threats. As set forth in the example of FIG. 4A, NoTA may provide intra-device service access making it possible to build independent subsystems providing both services and applications. Moreover, example implementations may include several individual NoTA devices involved in direct inter sub-system communication.

Figure 4B:
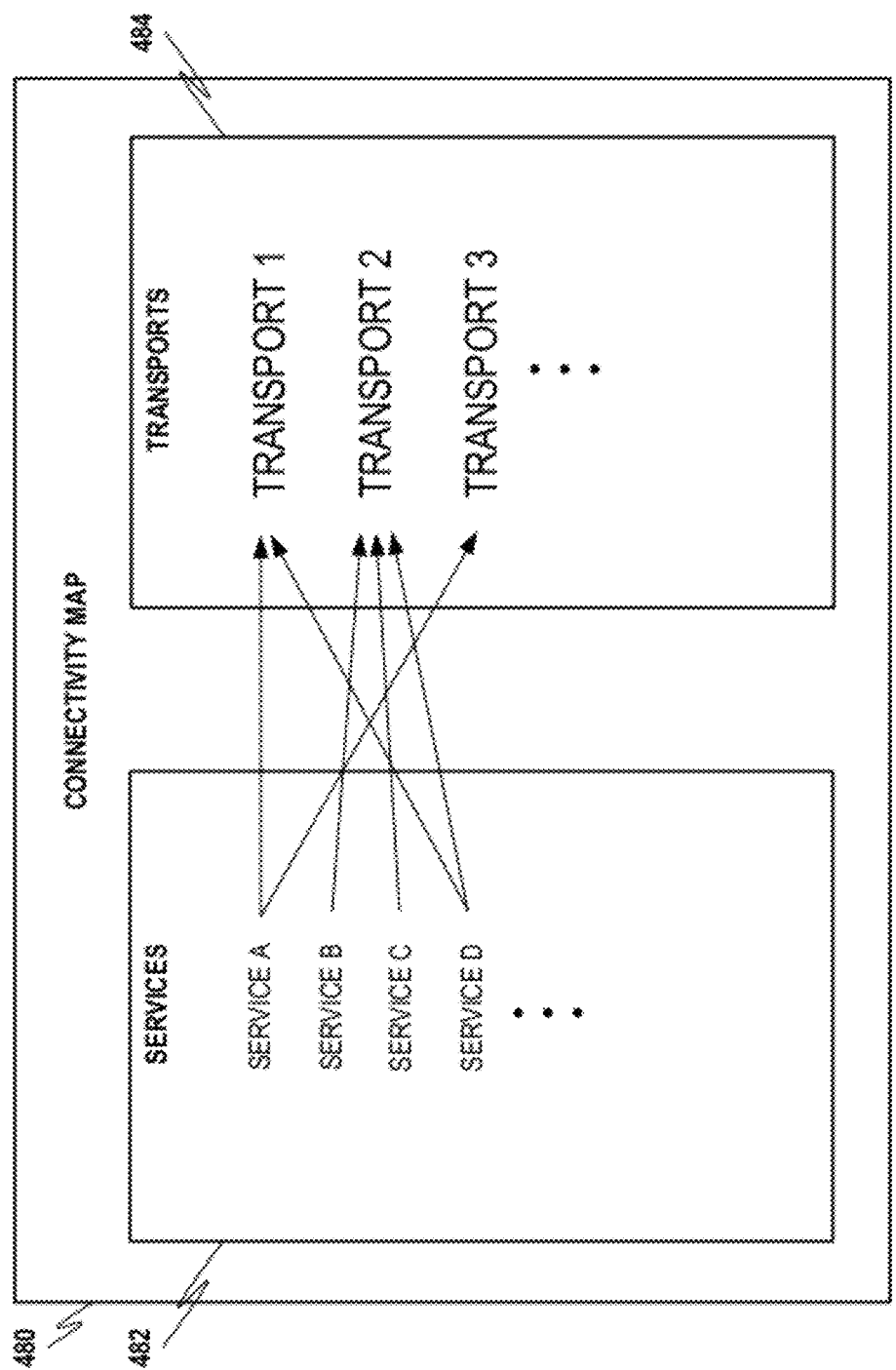
FIG. 4B discloses an example transport table in accordance with at least one embodiment of the present invention.

FIG. 4B discloses another structure that may be implemented in accordance with various embodiments of the present invention. Connectivity map 480 may associate services available on apparatuses participating in billboard table 320 with communication transports that may be utilized in conjunction with each service. Examples of communication transports may include, but are not limited to, wireless communication mediums such as Bluetooth, WLAN, Bluetooth LE (BTLE), wUSB, etc. In addition, at least one embodiment of the present invention may also apply radio technologies to different protocols (e.g., Bluetooth protocols may be implemented over WLAN). However, the various embodiments the present invention are not specifically limited to using these particular communication transports, and may be implemented with other wired or wireless communication mediums that are usable by services offered by various participating apparatuses. Services (e.g., offered by apparatuses) in FIG. 4B may be listed under services 482, and the corresponding available transports are listed under transports 484. Arrows between services 482 and transports 484 indicate the one or more transport mediums that are usable by each service. Information in connectivity map 480 may, in accordance with various embodiments of the present invention, bind billboard table content (e.g., service offerings) and available apparatus connectivity configuration. This information may be utilized, for example, by applications when determining the communication transports that are usable with a particular service. Where two or more transport mediums are usable, a particular communication medium may ultimately be selected based on characteristics such as speed, traffic, priority of executing the service, other active wireless communication mediums, etc.

Now referring to FIG. 5A, an example depicting a wireless transaction between apparatuses 500 and 520 is disclosed in accordance with at least one embodiment of the present invention. In this instance, BB service search 502 on device 500 may require the use of a particular service. Further, billboard table 320 may reside on device 520. Regardless of the actual location of the service required by BB service search 502, billboard table 320 may be queried to gain access to a corresponding service node. This is because all available service information on the one or more devices participating in billboard table 320 is centrally located, reducing the steps required to access each service, and therefore, increasing the speed of access for available services. In addition, various embodiments of the present invention may include more than one billboard table 320 established between the linked devices. These billboard tables 320 may interact with each other to create a shared information pool that services may access.

BB service search 502 may, for example, utilize NoTA service 504 residing on device 500 in order to access billboard table 320. In this example, connectivity map 506 may identify at least Bluetooth (BT) 508 as a transport medium usable by NoTA service 504. Other communication transports may also be usable, however in this example Bluetooth 508 is selected (e.g., by a user, by BB service search 502, by applications triggering BB service search 502, etc.) Communication link 510 may then be established between apparatuses 500 and 520 via BT 508.

Figure 5B:
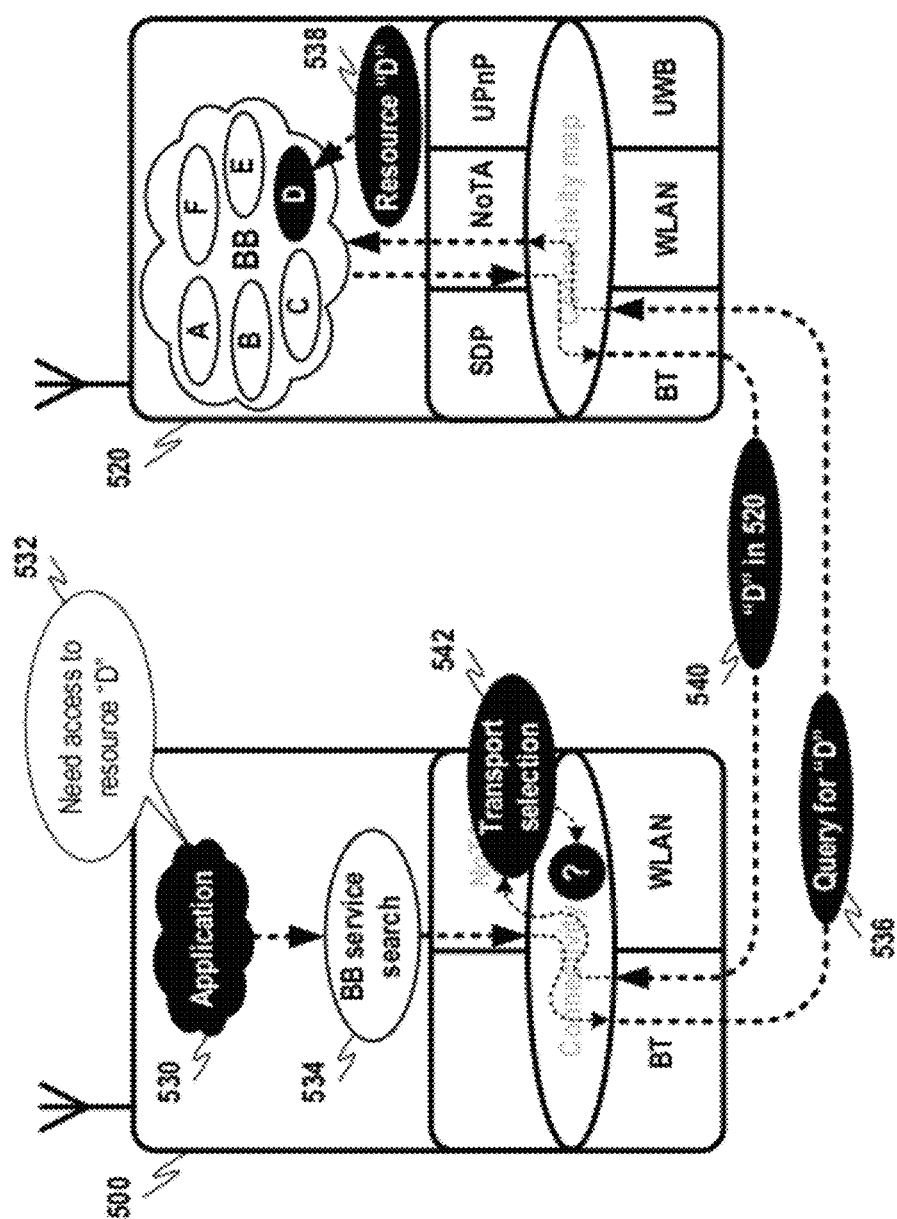
FIG. 5B discloses an example of communication configuration formulation in accordance with at least one embodiment of the present invention.

The wireless query sent by apparatus 500 may then be received in apparatus 520. Bluetooth resources 522 in apparatus 520 may be usable by NoTA service 526 as determined by a mapping in connectivity map 524. NoTA service 526 may provide access to query billboard table 320, which may contain various service information entries 528 corresponding to various services available in the linked wireless communication devices. Again, while two apparatuses are shown in the example of FIG. 5, more than two apparatuses may participate in billboard table 320, including service nodes 528 corresponding to services that are offered by each device. BB service search 502 may then query the service information entries 528 available in billboard table 320 in order to determine if any of the services corresponding to service information entries 528 will be suitable for the parameters specified in the search. An example query of billboard table 330 is now described with respect to FIG. 5B.

In accordance with at least one example embodiment of the present invention, FIG. 5B discloses a possible interaction between apparatuses 500 and 520. Interaction between two apparatuses has been disclosed in FIG. 5B for the sake of explanation herein, however, the implementation is not limited to only two apparatuses. Interaction in this scenario may be initiated by either apparatus, but in the disclosed example is triggered by application 530 in apparatus 500. Application 530 may be, for example, a software/program module that upon activation, execution or user interaction necessitates access to a resource as shown as at 532.

In accordance with the previously disclosed example embodiments of the present invention, BB search 534 may utilize a transport, such as Bluetooth™ (BT), to perform query 536 of available resources in the NoTA environment. The same transport may further be used to exchange connectivity map information, which may eventually be utilized in transport selection 542 when appropriate transports are to be selected. The accumulation of this available resource information may help facilitate the identification of potential providers for requested resources, such as resource "D" requested by application 530. For example, information in BB 320 may disclose that resource "D" 538 actually resides on apparatus 520 in the NoTA environment, and therefore, apparatus 520 is capable of acting as a "provider" for resource "D" to apparatus 500.

A response 540 to inquiry 536 may be returned identifying one or more potential resources (e.g., services, databases, etc.) residing on at least one provider (in this case apparatus 520). However, subsequent transactions cannot be limited to utilizing the transport that was initially selected in order to perform the query. For example, high speed, low power, low throughput transports like Bluetooth LE (BTLE) may be adequate for performing initial queries, but would not be likewise appropriate for subsequent communication if large amounts of data are to be conveyed, a low amount of errors is required or other similar requirement exist. As a result, a determination may be made at 542 as to maintain use of the current transport or to select a new transport based, for example, on various decision criteria such as described herein.

IV. Location-Based Decision Criteria

FIG. 6 discloses an example of another potential source for decision criteria that may be used alone or in conjunction with decision criteria that is available, for example, in an NoTA environment or other coexistence scheme. While location-related information may be used primarily to identify the current position of an apparatus, current apparatus position may correlate to other information that, for example, may describe the environment in which an apparatus is operating. FIG. 6 adds to the example interfaces 106 disclosed in FIG. 1B. In accordance with at least one embodiment of the present invention, location information 600 may be provided in an apparatus (e.g., to processor 102) from various sources generally categorized as "A" and "B" in FIG. 6. "A" in FIG. 6 may correspond to location information that is provided by existing apparatus-level communication interfaces 150. For example, computing apparatus 100 may register with a long-range wireless network, establish a short range wireless link, scan machine-readable information from a tag or physically connect to a wireless network via one of the interfaces disclosed at 150. The network or apparatus with which computing apparatus 100 is communicating may then, at some point after a link is negotiated, provide position-related information to computing apparatus 100.

In alternative implementation "B", usable alone or in combination with the above, an interface reserved specifically for obtaining location-related information may be provided in other interfaces 170. For example, a global positioning system (GPS) receiver may be integrated in, or coupled to, computing apparatus 100 for the provision of location information. Location information may be obtained by the interface upon request, periodically, or in accordance with other data acquisition methods as known in the art. An example of location information sources "A" and "B" being used together may occur in apparatuses having a dedicated-type interface "B" that only operates in particular situations (e.g., when the apparatus is outside to receive satellite signals), and so a type "A" interface may be used to obtain location information when the type "B" interface cannot (e.g., when the apparatus is inside a structure such as an office, home, etc.).

Figure 7:
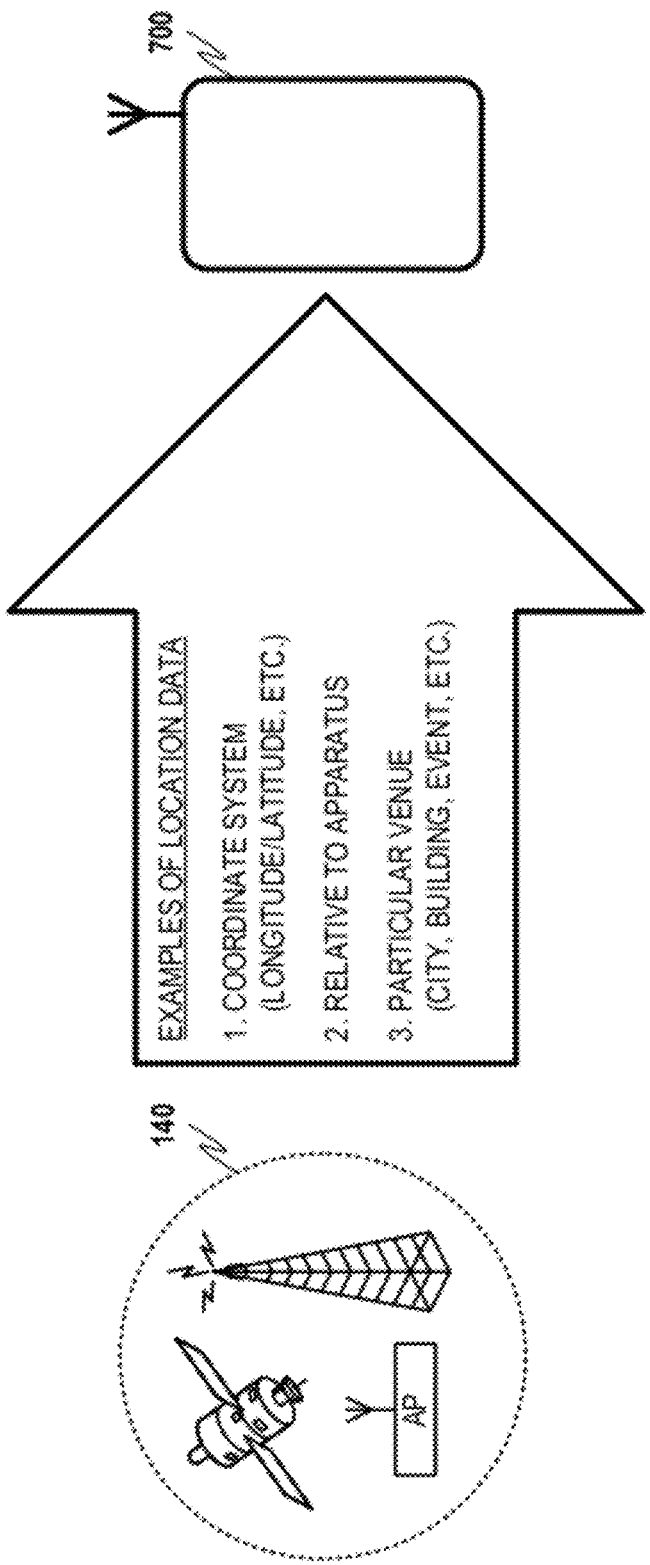
FIG. 7 discloses an example of location-related information usable with at least one embodiment of the present invention.

Now referring to FIG. 7, examples of location information that may be provided to/obtained by apparatuses are disclosed. Location information providers may encompass the information conduits 140 that were initially disclosed in FIG. 1 such as satellites, cellular/radio towers, other apparatuses (e.g., access points), etc. Apparatus 700 may, for example, receive location information in one or more of the formats listed in FIG. 7. Coordinate system data may comprise positional information such as longitude and latitude, polar coordinates, etc. While many coordinate systems identify the absolute position of an object, relative coordinate systems are also available for determining location. For example, the position of an apparatus may be defined with respect to an access point (e.g., direction and distance from an access point), may be approximated via triangulation using information provided by cellular towers with which an apparatus is registered, etc. In still a third example, position may be characterized based on physical locations sensed in close proximity to an apparatus. Scanned machine-readable tags or received signals may identify an apparatus as in a particular city, on a particular street, inside of a structure or attending an event (e.g., concert, sporting event, convention, etc.). Regardless of the actual source of the location information or the format in which the information is provided, in accordance with at least one embodiment of the present invention, location information may be used to expedite link configuration as will be described with respect to FIG. 8-10 below.

V. Example Link Configuration

Figure 8:
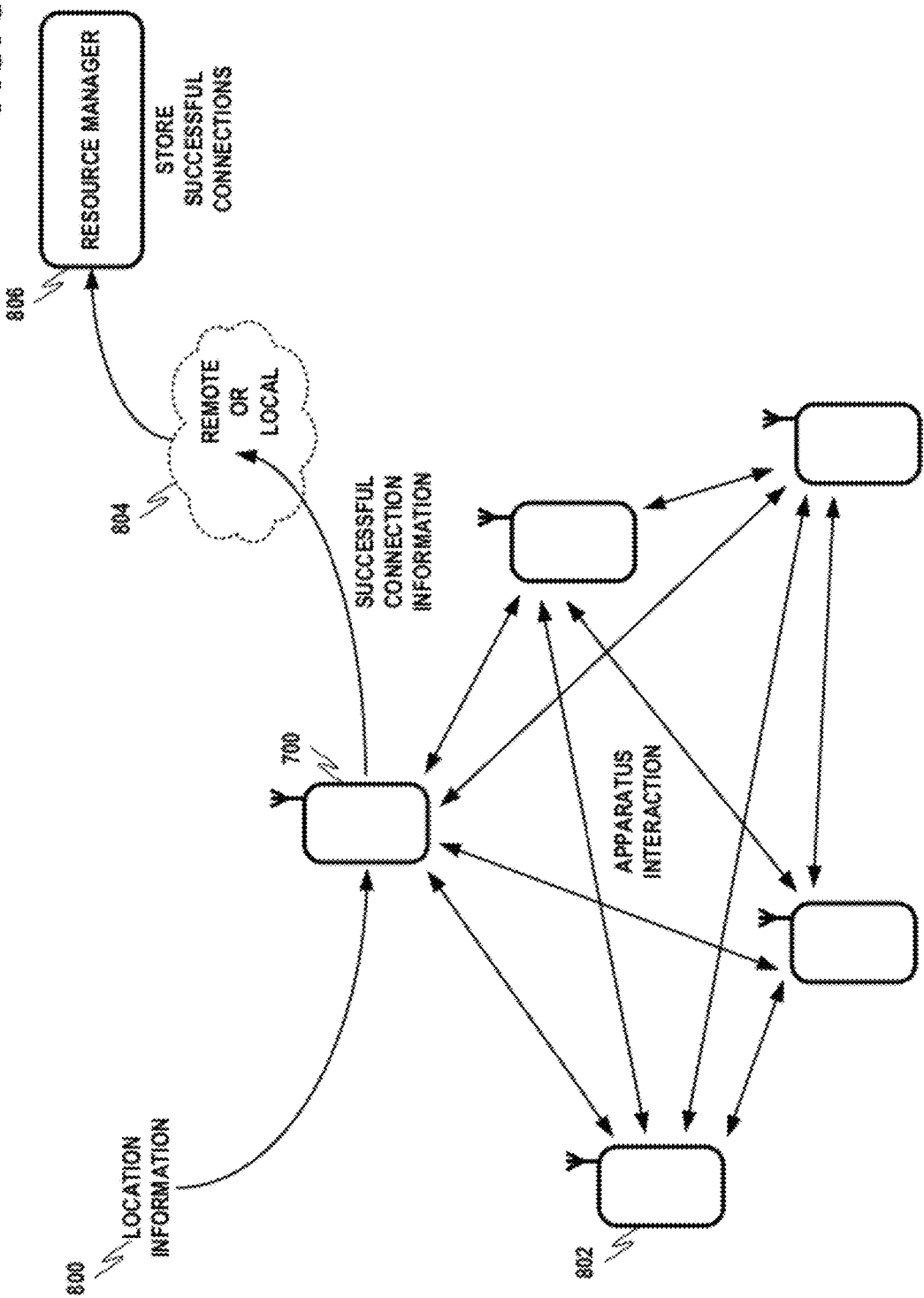
FIG. 8 discloses an example of providing successful connection information to a resource manager in accordance with at least one embodiment of the present invention.

FIG. 8 discloses an example of successful connection information accumulation in accordance with at least one embodiment of the present invention. During more generalized operation apparatuses may interact with apparatuses using short-range wireless communication like WLAN or Bluetooth. Such operation may involve scanning for nearby apparatuses, and upon finding apparatuses performing further investigatory operations into how the apparatuses communicate (e.g., what transports are supported), what resources are available in each device, how are these resources accessible (e.g., over which supported transports), and finally, selection of the most appropriate transport accessing each resource. Such investigation may involve many communication attempts, information exchanges, etc., which not only expends apparatus energy and processing resources, but also wastes time as some apparatuses may be mobile and may only spend limited amounts of time in range of a querying device. By the time apparatuses identify resource providers and configure an appropriate communication configuration the device may no longer be accessible. At least one embodiment of the present invention attempts to alleviate such issues by leveraging previous successful connection information to expedite resource access.

An initial precondition to expediting resource access is accumulating successful connection information. In FIG. 8 apparatus 700 may interact with other apparatuses 802 within a particular area (e.g., within range of its the wireless communication transports supported by apparatus 700). The successful connections made to other apparatuses, and the resources that were accessed on these other apparatuses, may be logged by the apparatus over time. At various times (e.g., periodically, triggered by a certain number of successful connections, based on the current condition of the apparatus, etc.), apparatus 700 may transmit via local/remote connection 804 successful connection information to a resource manager 806. Local/remote connection 804 may be defined in terms of the type of architecture in which the apparatuses are operating. For example, if apparatus 700 is participating in a coexistence architecture that allows for apparatus operation in white space (e.g., TVWS system) such as defined in accordance with IEEE 802.19, then resource manager 806 may reside on a remote server accessible via a WAN connection like the Internet. On the other hand, apparatuses operating in a NoTA may interact with each other via a shared memory space, and in such instances resource manager 806 may reside in a shared memory space section of a local apparatus that is participating in the NoTA environment.

Regardless of the access configuration for resource manager 806, apparatus 700 may retain successful connection information regarding some or all of the other apparatuses 802 and then provide this information to resource manager 806. Successful connection information may include communication configurations utilized to access each apparatus 802, indications of the resources available on particular apparatuses 802, indications of other characteristics of each apparatus 802 (e.g., detailed identification information, fixed or mobile, security configuration, high QoS connection support, etc.). In accordance with at least one embodiment of the present invention, the successful connection information may further be tied to current location 800 of apparatus 700. For example, current location 800 may serve as a search parameter for storing the successful connection information. In such instances apparatus 700 may comprise location determining functionality such as set forth in FIGS. 6-7, and may provide current location 800 of the apparatus to resource manager 806 in association with successful connection information. Resource manager 806 may receive successful connection information from apparatus 700 and other apparatuses, and may store the successful connection information for use by apparatuses requiring access to resources in a particular location such as disclosed in the example of FIG. 9.

Figure 9:
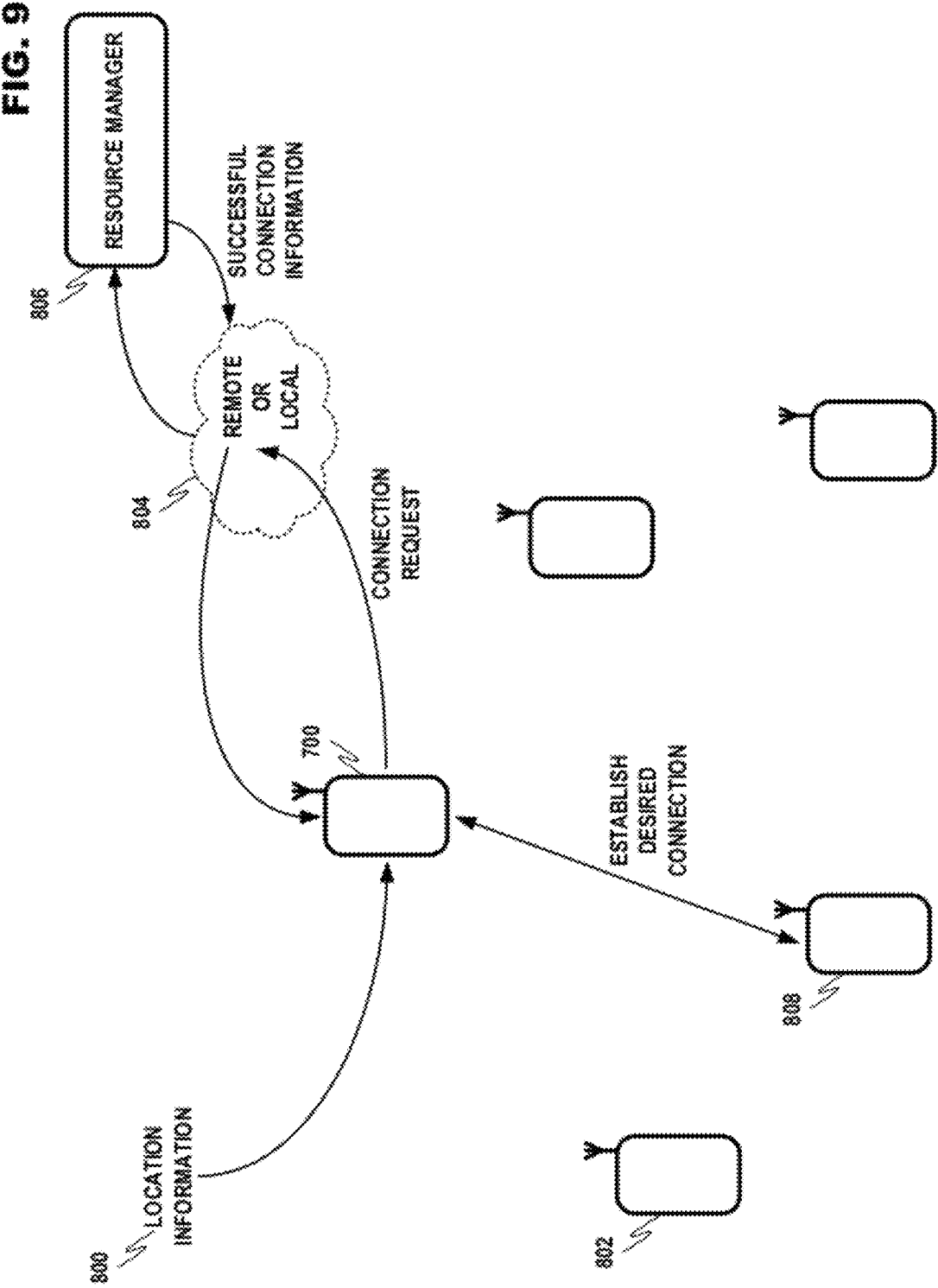
FIG. 9 discloses an example of receiving connection information from a resource manager in accordance with at least one embodiment of the present invention.

In the example disclose in FIG. 9, apparatus 700 may desire to access resources that may be available in its current location. More specifically, apparatus 700 may have a need to access resources without knowledge of their availability at its current location, or may know that certain resources are available at the current location without being aware of how to actually access the resources. In order to avoid a "guess and check" type of inquiry into what resources are available in a particular location and how the resources may be accessed, apparatus 100 may instead transmit a request for access to a desired resources via remote or local connection 804 to resource manager 806. The most basic access request may simply comprise the current location of the apparatus (if location functionality is available in the apparatus). The current location may be absolute (e.g., latitude/longitude) or relative with respect to other signals and/or apparatuses that are sensed in the area. Otherwise, access requests may also contain parameters identifying a desired resource and parameters that relate to desired access performance. For instance, if apparatus 700 desires to stream data (e.g., audio/video data), a minimum QoS may be indicated in the access request. Other parameters may pertain to link integrity (e.g., error correction and redundancy), security, etc. In response to the access request, successful connection information may be received in apparatus 700 from resource manager 806 via local/remote connection 804.

The successful connection information that is received in apparatus 700 may take various forms, and thus, the processing of this information in apparatus 700 may depend on the received format. It is possible for resource manager 806 to provide connection information for a large area to apparatus 700. This information may take the form, for example, of a catalog of various regions, the apparatuses residing in these regions, resources available on each apparatus, communication configurations supported by each apparatus, etc. Apparatus 700 would then be required to evaluate this information in view of, for example, its own abilities and condition in order to determine the best link configuration for accessing the desired resource. This process may prove more expeditious when view at the system level where many apparatuses may be accessing resource manager 806 in order to provide or request successful connection data, but it also requires that apparatus 700 includes sufficient processing ability in order to evaluate the successful connection data in order to arrive at a preferred link configuration. Alternatively, it is also possible to place the processing burden on resource manager 806. In such implementations apparatus 700 may provide desired resource and location information 800 to resource manager 806, resource manager 806 may evaluate the information and then provide a link configuration back to apparatus 700 for use in accessing the resource. At least one benefit that is realized in this configuration is that even lower sophistication apparatuses (e.g., without substantial processing ability) may be able to benefit from the system since limited information processing occurs at the device level. Another benefit is that link configuration is determined at the system level, allowing for system-wide management of wireless traffic. For example, the preferred link configuration sent to apparatus 700 may be selected not only to meet the resource access needs of the apparatus, but also to avoid potential conflicts in view of other existing wireless traffic (e.g., sensed/reported wireless traffic, legacy equipment, etc). The ability to manage wireless traffic may integrate well with the previously describe coexistence management architectures. Regardless of how the determination of a preferred link configuration is ultimately made, the link configuration may then be utilized by apparatus 700 in order to access the desired resource.

Figure 10A:
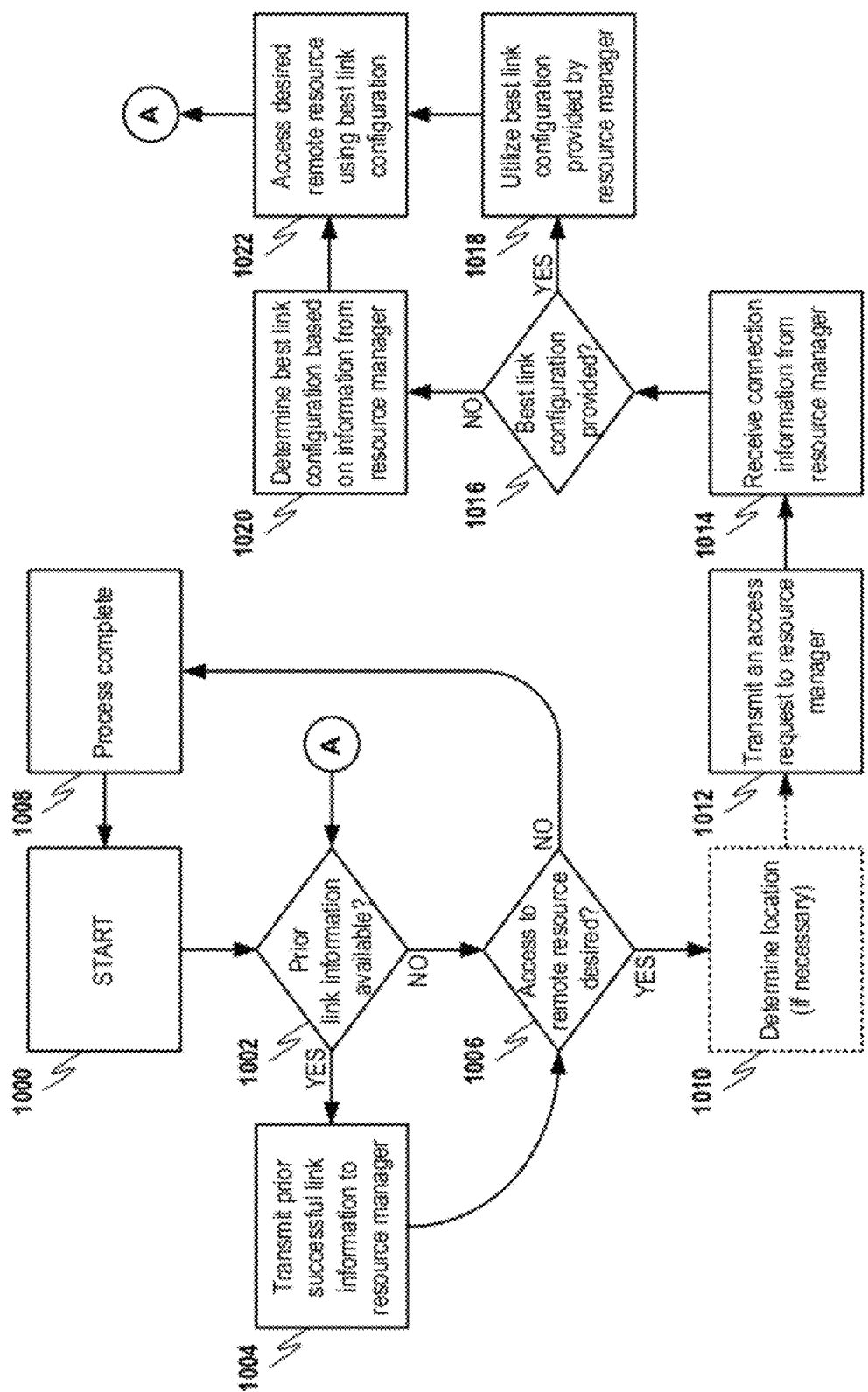
FIG. 10A discloses a flowchart for an example communication configuration process in accordance with at least one embodiment of the present invention.

A flowchart of an example communication process in accordance with at least one embodiment of the present invention is disclosed in FIG. 10A. The process may initiate in step 1000. A determination may then be made as to whether prior successful link information is available in an apparatus in step 1002. If prior successful link information is determined to be available, then in step 1004 this information may be transmitted to a resource manager. Depending on the system architecture in which the various embodiments of the present invention are being implemented, the resource manager may reside locally, for example on the requesting apparatus or another proximate device, or remotely, such as on a server accessible via a WAN (e.g., Internet) or other network connection. After the prior successful link information has been transmitted to the resource manager, or in step 1004 when it is determined that no information is available, the process may proceed to step 1006 wherein a further determination may be made as to whether access to a resource not in the apparatus (e.g., remote) is desired. If it is determined in step 1006 that access to a resource not in the apparatus is not desired, the process may then be complete in step 1008 and may return to start step 1000.

On the other hand, if in step 1006 it is determined that access to a resource is desired, then the process may continue to step 1010 where location is determined (if necessary). In some instances location functionality may not be available in an apparatus. It may also be possible for a resource manager to determine the location of the apparatus requesting access based on other information contained generally in a received access request. The process may then proceed to step 1012 where an access request is sent to a resource manager. As previously discussed, access requests may simply indicate current apparatus position, to which the resource manager may respond with successful connection information corresponding to the location, the successful connection information being usable by the apparatus in selecting link configurations. Alternatively, access requests may comprise information beyond current location information for the apparatus, such as a desired resource to be accessed and other desired parameters pertaining to the requested resource (e.g., connection quality parameters) usable by the resource manager for selecting a link configuration. The requesting apparatus may receive a response to the access request in step 1014 including at least connection information pertaining to the current location.

A determination may then be made in step 1016 as to whether "best" or preferred link configuration information was provided in the connection information. If the connection information comprises a best link configuration, then no additional processing may be required on the part of the apparatus. The process may then proceed to step 1018 where the requesting apparatus utilizes the best link configuration to configure communications in the apparatus. If in step 1016 it is determined that a best link configuration was not provided, then in step 1020 the requesting apparatus may determined the best link configuration by evaluating the connection information provided by the resource manager. This evaluation may include selecting a link configuration from a number of previously successful link configuration information provided by the resource manager based on requirements (e.g., QoS) for accessing the desired resource. Regardless of whether the best link configuration is provide to the apparatus in step 1018 or is determined by the apparatus in step 1020, the process may then proceed to step 1022 where the desired resource is accessed using the best link configuration. The process may then return to step 1002 (via jump reference "A") to again verify if any prior link information is available in the apparatus to transmit to the resource manager, and may then proceed as previously described.

Figure 10B:
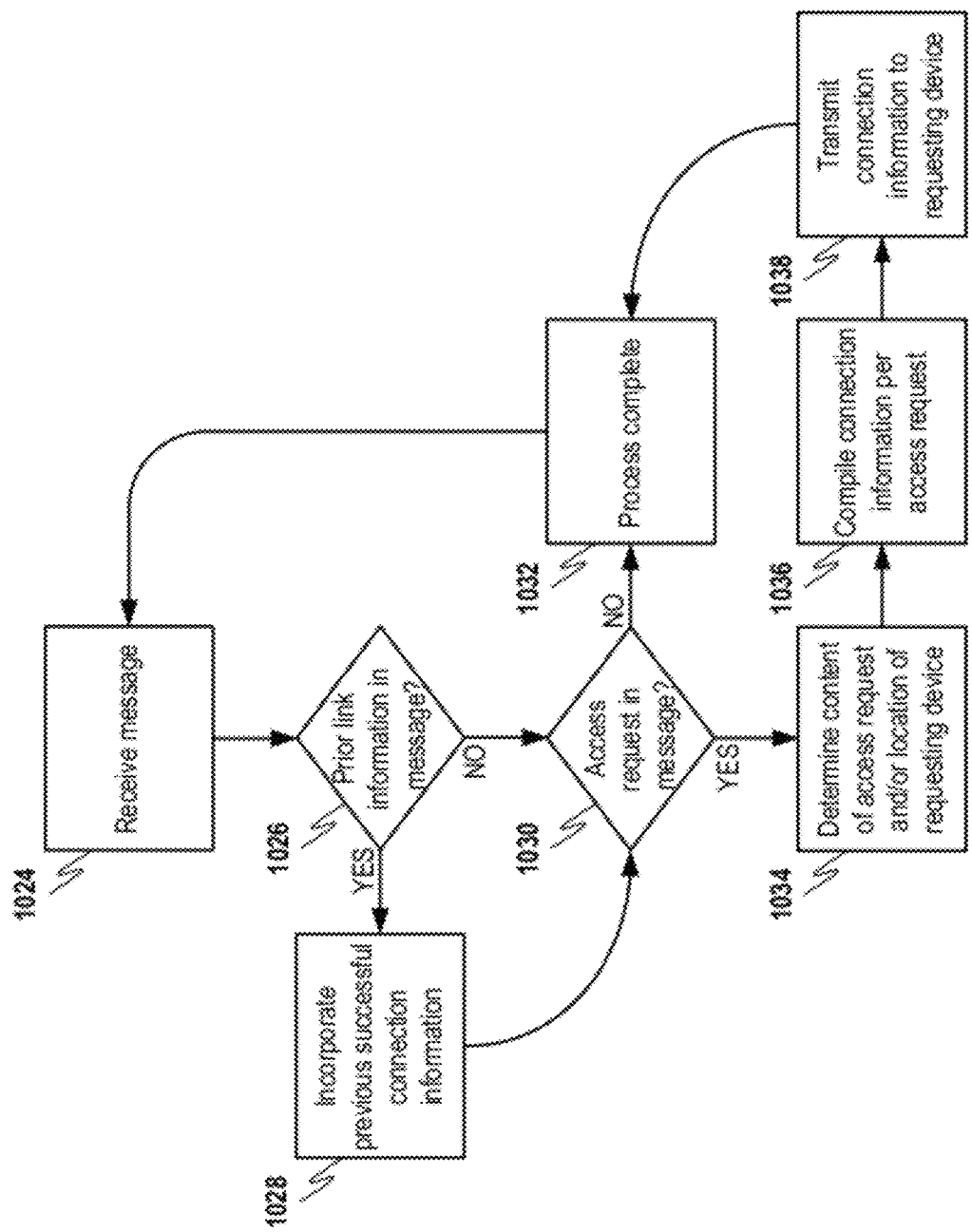
FIG. 10B discloses a flowchart for an example resource manager process in accordance with at least one embodiment of the present invention.

Now referring to FIG. 10B, in accordance with at least one embodiment of the present invention, an example communication process is disclosed. In step 1024 a message may be received (e.g., by a resource manager). In step 1026 a determination may then be made as to whether the received message comprises previously successful connection information. If it is determined that the received message comprises previously successful connection information, then in step 1028 the previously successful connection information may be stored by the resource manager. The process may then proceed from step 1028, or alternatively directly from step 1026 if it is determined that the received message does not contain previously successful connection information, to step 1030 where a further determination may be made as to whether the received message comprises a request for access to resources (e.g., an access request). If it is determined that the received message does not comprise an access request, then the process may terminate in step 1032 and may return to step 1024 in preparation for the next message to be received.

If in step 1030 a determination is made that the received message comprises an access request, the process may then proceed to step 1034 wherein the content of the access request and/or the location of the requesting device (e.g., the requestor) may be determined. An access request may comprise current location information for the requestor, or information from which the current location of the requestor may be derived by the resource manager. More comprehensive access requests may identify a resource to be accessed, supported communication technologies and other parameters related to the desired resource to be accessed. In step 1036 the resource manager may compile connection information based on the access request. Again, if the access request only contains location information the connection information may contain previous successful connection information corresponding to the location information. If the access request contains more specific device/desired resource information, the resource manager may be able to perform some or all of the processing required in determining an actual connection configuration for accessing the desired resource. Regardless of the content of the connection information, the resource manager may transmit the compiled connection information to the requesting apparatus in step 1038. The process may then be complete in step 1032 and may return to step 1024 in preparation for the next message receipt.

The various embodiments of the present invention are not limited only to the examples disclosed above, and may encompass other configurations or implementations.

For example, example embodiments of the present invention may encompass apparatuses comprising means for determining in an apparatus if access to resources not in the apparatus is desired, means for, if it is determined in the apparatus that access to the resources not in the apparatus is desired, the apparatus further comprising means for transmitting an access request for connection information to access the resources not in the apparatus to a resource manager, means for receiving connection information for accessing the resources not in the apparatus from the resource manager in response to the access request, and means for accessing the resources using a connection configuration based on the received connection information.

Another example embodiment of the present invention may encompass apparatuses comprising means for receiving a message in an apparatus, means for determining if the message comprises at least an access request for resources, means for, if the message is determined to comprise the access request, obtaining a location corresponding to a source of the request and formulating a response to the access request comprising connection configuration information for at least one previously successful connection to the resources based at least upon the location, and means for transmitting the response to the source of the request.

At least one other example embodiment of the present invention may include electronic signals that cause an apparatus to determine if access to resources not in the apparatus is desired, if it is determined in the apparatus that access to the resources not in the apparatus is desired, the electronic signals further causing the apparatus to transmit an access request for connection information to access the resources not in the apparatus to a resource manager, receive connection information for accessing the resources not in the apparatus from the resource manager in response to the access request, and access the resources using a connection configuration based on the received connection information.

Another example embodiment of the present invention may include electronic signals that cause apparatuses to receive a message, determine if the message comprises at least an access request to resources, if the message is determined to comprise the access request, obtain a location corresponding to a source of the request and formulating a response to the access request comprising connection configuration information for at least one previously successful connection to the resources based at least upon the location, and transmitting the response to the source of the request.

Another example embodiment of the present invention may include a system comprising an apparatus and a resource manager, the apparatus determining if access to resources not in the apparatus is desired, and if it is determined in the apparatus that access to the resources not in the apparatus is desired, the apparatus transmitting an access request for connection information to access the resources not in the apparatus to the resource manager, and the apparatus further receiving connection information for accessing the resources not in the apparatus from the resource manager in response to the access request, and accessing the resources using a connection configuration based on the received connection information.

Accordingly, it will be apparent to persons skilled in the relevant art that various changes in form a and detail can be made therein without departing from the spirit and scope of the invention. The breadth and scope of the present invention should not be limited by any of the above-described example embodiments, but should be defined only in accordance with the following claims and their equivalents.

What is claimed:

1. A method, comprising:

transmitting, by an apparatus, an access request for connection information to access locally available resources not in the apparatus, said access request being transmitted to a remote location over a wide area network connection, the access request comprising at least current location information regarding the apparatus;

receiving connection information for accessing the locally available resources not in the apparatus in response to the access request; and accessing the locally available resources using a connection configuration based on the received connection information.

2. The method of claim 1, wherein the access request further comprises desired connection parameters for accessing the resources.

3. The method of claim 2, wherein the received connection information comprises at least connection configurations corresponding to at least one previously successful connection for accessing the resources at the current location.

4. The method of claim 1, wherein the received connection information is a connection configuration usable by the apparatus for accessing the resources via another apparatus.

5. The method of claim 1, further comprising transmitting connection information for previously successful connections for accessing locally available resources not in the apparatus to a provider of the received connection information.

6. A method, comprising:
receiving, in an apparatus, over a wide area network connection from a remotely located source apparatus an access request for connection information to access resources that are locally available to the source apparatus but not in the source apparatus, the access request comprising at least current location information regarding the source apparatus;
formulating a response to the access request comprising connection configuration information for at least one previously successful connection to the locally available resources based at least upon the current location information regarding the source apparatus; and
transmitting the response to the source apparatus.

7. The method of claim 6, further comprising receiving in the apparatus from the source apparatus connection information for previously successful connections and storing the connection information for previously successful connections in the apparatus.

8. A computer program product comprising computer executable program code recorded on a non-transitory computer readable storage medium, the computer executable program code comprising:
code configured to cause an apparatus to:
transmit an access request for connection information to access locally available resources not in the apparatus, said access request being transmitted to a remote location over a wide area network connection, the access request comprising at least current location information regarding the apparatus;
receive connection information for accessing the locally available resources not in the apparatus in response to the access request; and
access the locally available resources using a connection configuration based on the received connection information.

9. The computer program product of claim 8, wherein the access request further comprises desired connection parameters for accessing the resources.

10. The computer program product of claim 9, wherein the received connection information comprises at least connection configurations corresponding to at least one previously successful connection for accessing the resources at the current location.

11. The computer program product of claim 8, wherein the received connection information is a connection configuration usable by the apparatus for accessing the resources via another apparatus.

12. The computer program product of claim 8, further comprising code configured to cause the apparatus to transmit connection information for previously successful connections for accessing locally available resources not in the apparatus to a provider of the received connection information.

13. A computer program product comprising computer executable program code recorded on a non-transitory computer readable storage medium, the computer executable program code comprising:
code configured to cause an apparatus to receive over a wide area network connection from a remotely located source apparatus an access request for connection information to access resources that are locally available to the source apparatus but not in the source apparatus, the access request comprising at least current location information regarding the source apparatus;
code configured to cause the apparatus to formulate a response to the access request comprising connection configuration information for at least one previously successful connection to the locally available resources based at least upon the current location information regarding the source apparatus; and
code configured to cause the apparatus to transmit the response to the source apparatus.

14. The computer program product of claim 13, further comprising receiving in the apparatus from the source apparatus connection information for previously successful connections and storing the connection information for previously successful connections in the apparatus.

15. An apparatus, comprising:
at least one processor; and
at least one memory including executable instructions, the at least one memory and the executable instructions being configured to, in cooperation with the at least one processor, cause the apparatus to perform at least the following:
transmit an access request for connection information to access locally available resources not in the apparatus, said access request being transmitted to a remote location over a wide area network connection, the access request comprising at least current location information regarding the apparatus;
receive connection information for accessing the locally available resources not in the apparatus in response to the access request; and
access the locally available resources using a connection configuration based on the received connection information.

16. The apparatus of claim 15, wherein the access request further comprises desired connection parameters for accessing the resources.

17. The apparatus of claim 16, wherein the received connection information comprises at least connection configurations corresponding to at least one previously successful connection for accessing the resources at the current location.

18. The apparatus of claim 15, wherein the received connection information is a connection configuration usable by the apparatus for accessing the resources via another apparatus.

19. The apparatus of claim 15, further comprising the at least one memory and the executable instructions being configured to, in cooperation with the at least one processor, cause the apparatus to transmit connection information for previously successful connections for accessing locally available resources not in the apparatus to a provider of the received connection information.

20. An apparatus, comprising:
at least one processor; and
at least one memory including executable instructions, the at least one memory and the executable instructions being configured to, in cooperation with the at least one processor, cause the apparatus to perform at least the following:
receive over a wide area network connection from a remotely located source apparatus an access request for connection information to access resources that are locally available to the source apparatus but not in the source apparatus, the access request comprising at least current location information regarding the source apparatus and formulate a response to the access request comprising connection configuration information for at least one previously successful connection to the locally available resources based at least upon the current location information regarding the source apparatus; and transmit the response to the source apparatus.

21. The apparatus of claim 20, further comprising receiving in the apparatus from the source apparatus connection information for previously successful connections and storing the connection information for previously successful connections in the apparatus.

* * * * *